United States Patent
Takaoka et al.

(10) Patent No.: US 7,652,565 B2
(45) Date of Patent: Jan. 26, 2010

(54) SENSOR NETWORK SYSTEM, SENSOR NODE, SENSOR INFORMATION COLLECTOR, METHOD OF OBSERVING EVENT, AND PROGRAM THEREOF

(75) Inventors: Masanori Takaoka, Tokyo (JP); Toshiyasu Nakao, Tokyo (JP)

(73) Assignee: NEC Corporation (JP)

( * ) Notice: Subject to any disclaimer, the term of this patent is extended or adjusted under 35 U.S.C. 154(b) by 481 days.

(21) Appl. No.: 11/532,174

(22) Filed: Sep. 15, 2006

(65) Prior Publication Data

US 2007/0067742 A1 Mar. 22, 2007

(30) Foreign Application Priority Data

Sep. 16, 2005 (JP) .............................. 2005-270483

(51) Int. Cl.
G08B 29/00 (2006.01)
G08B 25/00 (2006.01)
G06F 15/00 (2006.01)

(52) U.S. Cl. ...................... 340/506; 340/525; 340/521; 340/522; 340/3.1; 702/186

(58) Field of Classification Search ................. 340/506, 340/525
See application file for complete search history.

(56) References Cited

U.S. PATENT DOCUMENTS 6,909,997 B2 * 6/2005 Chen et al. .................. 702/189
7,096,125 B2 * 8/2006 Padmanabhan et al. ....... 702/24
2002/0069018 A1 * 6/2002 Brueckner et al. ........... 701/300
2003/0216949 A1 * 11/2003 Kram et al. .................... 705/5
2006/0176169 A1 * 8/2006 Doolin et al. ................ 340/521

FOREIGN PATENT DOCUMENTS

JP 57-202161 12/1982
JP 2001-45020 2/2001

OTHER PUBLICATIONS

Shen and two others, "Sensor Information Networking Architecture and Applications", IEEE Personal Communication, U.S. Aug. 2001, p. 52-59.
Kazuyuki Tanaka "Theoretical Study of Hyperparameter Estimation by Maxinization of Marginal Likelihood in Image Restoration by Means of Cluster Variation Metho", ICICE Transactions (A), the Institute of Electronics, Information and Communication Engineers. vol. J83-A, No. 10, pp. 1148-1160. Oct. 2000.

* cited by examiner

Primary Examiner—Donnie L Crosland
(74) Attorney, Agent, or Firm—Ostrolenk Faber LLP

(57) ABSTRACT

In a sensor network system, sensor data having a high precision (high resolution) is collected, and congestion of a communication network and an apparatus for processing the sensor data is suppressed. A sensor node has a contribution degree calculator for calculating an influence that the detected sensor information exerts upon the entire system precision (resolution). A first communicating circuit transmits sensor information responding to a calculated contribution so that no congestion caused by transmitting too large a quantity of data all at once occurs.

35 Claims, 15 Drawing Sheets

SENSOR NETWORK SYSTEM, SENSOR NODE, SENSOR INFORMATION COLLECTOR, METHOD OF OBSERVING EVENT, AND PROGRAM THEREOF

BACKGROUND OF THE INVENTION

The present invention relates to a sensor network system, a sensor node, a sensor information collector, a method of observing an event, and a program thereof, and more particularly to a sensor network system having a sensor information collection function with a high precision (high resolution) and a congestion suppression function, a sensor node, a sensor information collector, a method of observing an event, and a program thereof.

As a means for collecting information detected by a plurality of sensors installed in a room, a building, etc. there exists a sensor network. The sensor network includes a sensor node that detects and transmits the event.

And, so as to enhance a precision (resolution) of the information detected by the sensor, there exist the apparatus for shortening a period at which the sensor node transmits information, thereby to enhance a temporal resolution (see, for example, patent document 1, identified below) and the method of enhancing a spatial resolution by increasing a spatial density of the sensor node that transmits information.

Further, so as to avoid the problem (response implosion problem) that all of the sensor nodes observing the identical event result in transmitting a large quantity of information all at once, there exists the method of transmitting information by each sensor node after a delay time that differs sensor node by sensor node, thereby to allow the congestion to be avoided (see, for example, patent document 2, identified below), and the method of selecting the sensor node at random that transmits information (see, for example, non-patent document 1, identified below).

Additionally, explanation of a Markov random field is described in non-patent document 2, identified below.

[Patent document 1] JP-P1982-202161A (FIG. 1)

[Patent document 2] JP-P2001-45020A (Paragraphs 0022 to 0041, and FIG. 1)

[Non-Patent document 1] C. Shen and two others, "Sensor Information Networking Architecture and Applications", IEEE Personal Communications, U.S., August, 2001, p. 52-59

[Non-Patent document 2] Kazuyuki TANAKA "Theoretical Study of Hyperparameter Estimation by Maximization of Marginal Likelihood in Image Restoration by Means of Cluster Variation Method", IEICE Transactions (A), the Institute of Electronics, Information and Communication Engineers. Vol. J83-A, No. 10, pp. 1148-1160. October, 2000.

However, like the case of the apparatus described in the patent document 1, shortening the period at which the sensor node transmits information in some cases, or increasing the spatial arrangement density of the sensor node in order to enhance the spatial resolution of information that the sensor node transmits in some cases causes the response implosion problem that all of the sensor nodes having observed the identical event transmit a large quantity of data all at once. And, the communication network could get congested in some cases, and the information processing ability in the reception side that receives data could be exceeded in some cases.

The reason is that, in the prior art, it is impossible to enhance the precision (resolution) of information, which the sensor node transmits, without increasing the traffic quantity.

Further, in the method described in the patent document 2, or the method described in the non-patent document 1, for example, a random delay time in transmission is inserted, or the sensor node transmitting data is adopted or rejected at random as a control of transmitting sensor data in order to avoid all of the sensor nodes observing the identical event from transmit a large quantity of data all at once. For this, the precision (resolution) of information could decline because the information communication quantity a unit time decreases in some cases, and the number of the sensor node transmitting information decreases in some cases.

The reason is that the conventional sensor network system takes no consideration into reducing the traffic without lowering the precision (the temporal resolution and the spatial resolution) of information that the sensor transmits.

Thereupon, the present invention has an object of providing a sensor network system that enables information of which the precision (temporal resolution and spatial resolution) is high to be collected and the congestion due to information transmitted by the sensor node to be suppressed, a sensor node, a sensor information collector, a method of observing an event, and a program thereof.

SUMMARY OF THE INVENTION

In order to accomplish the above-mentioned object, the sensor network system in accordance with the present invention, which is a sensor network system having a plurality of sensor nodes each including a sensor for detecting an event that has occurred, and an application apparatus for processing sensor information indicating the event detected by the sensor, is characterized in that the sensor node includes a communicating means for transmitting the sensor information at a timing corresponding to an influence that the event detected by the sensor exerts upon a sensor information distribution indicating a temporal distribution or a spatial distribution of the event, and that the application apparatus employs the sensor information distribution, thereby to process the sensor information.

The communicating means of the sensor node more preferentially may transmit the sensor information of which an influence is larger that the event detected by the sensor exerts upon the sensor information distribution.

The sensor node in which an event model obtained by making a modeling of the event that the sensor detects is set may include a contribution degree calculating means for, based upon the event model, calculating a contribution degree, being a degree at which an influence is exerted upon the sensor information distribution, and the communication means may transmit the sensor information at a timing corresponding to the contribution degree calculated by the contribution degree calculating means.

The contribution degree calculating means of the sensor node may calculate the contribution degree based upon the event that the sensor has detected currently, the event that the sensor detected in the past, and the event model.

The contribution degree calculating means of the sensor node may calculate the contribution degree based upon the event that the sensor has detected currently, the event that the sensor of the other sensor node has detected, and the event model.

The sensor node may include a model updating means for changing the event model set in the contribution degree calculating means for setting.

The sensor network system may have a server for receiving the sensor information from the sensor node, and the server may include a data collecting means for generating a sensor information distribution based upon the received sensor information.

The server may include an estimating means for, based upon the sensor information received from the other sensor node, or the sensor information that temporally or spatially neighbors sensor information that is deficient, and the set event model, estimating the sensor information that is deficient, thereby to restore the sensor information distribution.

The sensor network system may have a server for receiving the sensor information from the sensor node, and the server may include: a data collecting means for generating a sensor information distribution based upon the received sensor information; and a model deciding means for deciding the event model that a model updating means of the sensor node updates, based upon the sensor information distribution, and the model updating means of the sensor node may change the event model set in the contribution degree calculating means into the event model decided by the model deciding means.

The server may include an estimating means for, based upon the sensor information received from the other sensor node, or the sensor information that temporally or spatially neighbors sensor information that is deficient, and the set event model, estimating the sensor information that is deficient, thereby to restore the sensor information distribution, the model deciding means may decide an event model that is set in the estimating means, based upon the sensor information distribution, and the server further may include a model setting means for setting the event model decided by the model deciding means in the estimating means.

The server may include a sensor information distribution transmitting means for transmitting the sensor information distribution to an application apparatus.

The application apparatus may include a data collecting means for receiving sensor information from the sensor node, thereby to generate a sensor information distribution based upon the received sensor information.

The application apparatus may include an estimating means for, based upon the sensor information received from the other sensor node, or the sensor information that temporally or spatially neighbors sensor information that is deficient, and the set event model, estimating the sensor information that is deficient, thereby to restore the sensor information distribution.

The sensor node in accordance with the present invention, which is a sensor node having a sensor for detecting an event that has occurred, is characterized in including a communicating means for transmitting sensor information indicating the event detected by the sensor responding to an influence that the event detected by the sensor exerts upon a sensor information distribution indicating a temporal distribution or a spatial distribution of the event.

The sensor node in which an event model obtained by making a modeling of the event that the sensor detects is set may have a contribution degree calculating means for, based upon the event model, calculating a contribution degree, being a degree at which an influence is exerted upon the sensor information distribution.

The contribution degree calculating means may calculate the contribution degree based upon the event that the sensor has detected currently, the event that the sensor detected in the past, and the event model.

The contribution degree calculating means may calculate the contribution degree based upon the event that the sensor has detected currently, the event that the sensor of the other sensor node has detected, and the event model.

The sensor node may have a model updating means for changing the event model set in the contribution degree calculating means for setting.

The sensor information collector in accordance with the present invention, which is a sensor information collector connected to a plurality of sensor nodes each having: a sensor for detecting an event that has occurred; and a communication means for transmitting sensor information indicating the event detected by the sensor, is characterized in having a data collecting means for, based upon the received sensor information, generating a sensor information distribution indicating a temporal distribution or a spatial distributions of the event.

The sensor information collector may include an estimating means for, based upon the sensor information received from the other sensor node, or the sensor information that temporally or spatially neighbors sensor information that is deficient, and an event model obtained by making a modeling of the event that the sensor detects, which has been set, estimating the sensor information that is deficient, thereby to restore the sensor information distribution.

The sensor information collector may include a model deciding means for, based upon the sensor information distribution, deciding an event model obtained by making a modeling of the event that the sensor detects, which is set in the sensor node.

The sensor information collector may have: a model deciding means for, based upon the sensor information distribution, deciding an event model obtained by making a modeling of the event that the sensor detects, which is set in the estimating means; and a model setting means for setting the event model decided by the model deciding means in the estimating means.

The event observation method in accordance with the present invention, which is an event observation method employing a sensor network system having a plurality of sensor nodes each including a sensor for detecting an event that has occurred, and an application apparatus for processing sensor information indicating the event detected by the sensors, is characterized in including: an event detection step in which the sensor detects the event; a sensor information transmission step in which a communicating means of the sensor node transmits the sensor information at a timing corresponding to an influence that the event detected by the sensor in the event detection step exerts upon a sensor information distribution indicating a temporal distribution or a spatial distribution of the event; and a sensor information process step in which the application apparatus employs the sensor information distribution, thereby to process the sensor information.

In the sensor information transmission step, the communicating means of the sensor node more preferentially may transmit the sensor information of which an influence is larger that the event detected by the sensor exerts upon the sensor information distribution.

The event observation method may have a contribution degree calculation step in which a contribution degree calculating means of the sensor node in which the event model obtained by making a modeling of the event that the sensor detects has been set calculates a contribution degree, being a degree at which an influence is exerted upon the sensor information distribution, based upon the event model.

The contribution degree calculating means of the sensor node may calculate the contribution degree based upon the event that the sensor has detected currently, the event that the sensor detected in the past, and the event model in the contribution degree calculation step.

The contribution degree calculating means of the sensor node may calculate the contribution degree based upon the event that the sensor has detected currently, the event that the sensor of the other sensor node has detected, and the event model in the contribution degree calculation step.

The event observation method may have a model update step in which a model updating means of the sensor node changes the event model set in the contribution degree calculating means for setting.

The event observation method may have a data collection step in which a data collecting means of a server of the sensor network system generates the sensor information distribution based upon the received sensor information.

The event observation method may have an estimation step in which, based upon the sensor information received from the other sensor node, or the sensor information that temporally or spatially neighbors sensor information that is deficient, and the set event model, an estimating means of the server estimates the sensor information that is deficient, thereby to restore the sensor information distribution.

The event observation method may have: a data collection step in which the data collecting means of the server of the sensor network system generates a sensor information distribution based upon the received sensor information; and a model decision step in which a model deciding means decides the event model that the model updating means of the sensor node updates, based upon sensor information distribution, and the model updating means may change the event model set in the contribution degree calculating means into the event model decided in the model decision step by the model deciding means of the sensor node in a model update step.

The event observation method may have an estimation step in which, based upon the sensor information received from the other sensor node, or the sensor information that temporally or spatially neighbors sensor information that is deficient, and the set event model, an estimating means of the server estimates the sensor information that is deficient, thereby to restore the sensor information distribution, the model deciding means may decide the event model that is set in the estimating means, based upon the sensor information distribution in a model decision step, and the event observation method may further have a model setting step in which a model setting means of the server sets the event model decided by the model deciding means in the estimating means.

The event observation method may have a sensor information distribution transmission step in which a sensor information distribution transmitting means of the server transmits the sensor information distribution to the application apparatus.

The event observation method may have a data collection step in which a data collecting means of the application apparatus receives the sensor information from the sensor node to generate a sensor information distribution based upon the received sensor information.

The event observation method may have an estimation step in which, based upon the sensor information received from the other sensor node, or the sensor information that temporally or spatially neighbors sensor information that is deficient, and the set event model, an estimating means of the application apparatus estimates the sensor information that is deficient, thereby to restore the sensor information distribution.

The sensor node program in accordance with the present invention, which is a sensor node program that is installed in a computer, is characterized in causing the computer to perform a process of more preferentially transmitting the sensor information indicating the event detected by the sensor that exerts a larger influence upon a sensor information distribution indicating a temporal distribution or a spatial distribution of the event.

The sensor information collection program in accordance with the present invention, which is a sensor information collection program that is installed in a computer that is connected to a plurality of sensor nodes each having a sensor for detecting the event that has occurred, and receives sensor information indicating the event detected by the sensor, is characterized in causing the computer to perform a data collection process of, based upon the received sensor information, generating a sensor information distribution indicating a temporal distribution or a spatial distribution of the event.

As explained above, the present invention makes it possible to suppress the congestion due to the sensor information transmitted by the sensor node, and to provide the application apparatus information having a high precision because the communicating means of the sensor node transmits the sensor information at a timing responding to an influence that the event detected by the sensor exerts upon the sensor information distribution.

In a case where the communicating means of the sensor node is configured to preferentially transmit the sensor information that exerts a large influence upon the sensor information distribution, it is possible to provide the application apparatus information having a high precision.

In a case where the communicating means is configured to transmit the sensor information at a timing responding to the contribution degree calculated by the contribution degree calculating means, it is possible to provide the application apparatus information having a high precision responding to the contribution degree.

In a case where the contribution degree calculating means of the sensor node is configured to calculate the contribution degree based upon the event that the sensor has detected currently, the event detected in the past, or the event detected by the sensor of the other sensor node, it is possible to calculate the contribution degree based upon the temporally or spatially neighboring sensor information.

In a case where the sensor node is configured to include the model updating means for changing the event model set in the contribution degree calculating means for setting newly, it is possible to update the event model responding to how the sensor node is installed.

In a case where the sensor network system has a server, and the server is configured to include the data collecting means for, based upon the received sensor information, generating the sensor information distribution, and the estimating means for estimating the sensor information that is deficient, thereby to restore the sensor information distribution, it is possible to restore the sensor information distribution even though one part of the sensor information becomes deficient.

In a case where the server is configured to include the model deciding means for deciding the event model that the model updating means of the sensor node updates, it is possible to update the event model set in the contribution degree calculating means responding to the sensor information distribution.

In a case where the application apparatus is configured to include the data collecting means for generating the sensor information distribution based upon the received sensor information, and the estimating means for estimating the sensor information that is deficient, thereby to restore the sensor information distribution, it is possible to restore the sensor information distribution even though one part of the sensor information becomes deficient.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiment 1

Figure 1:
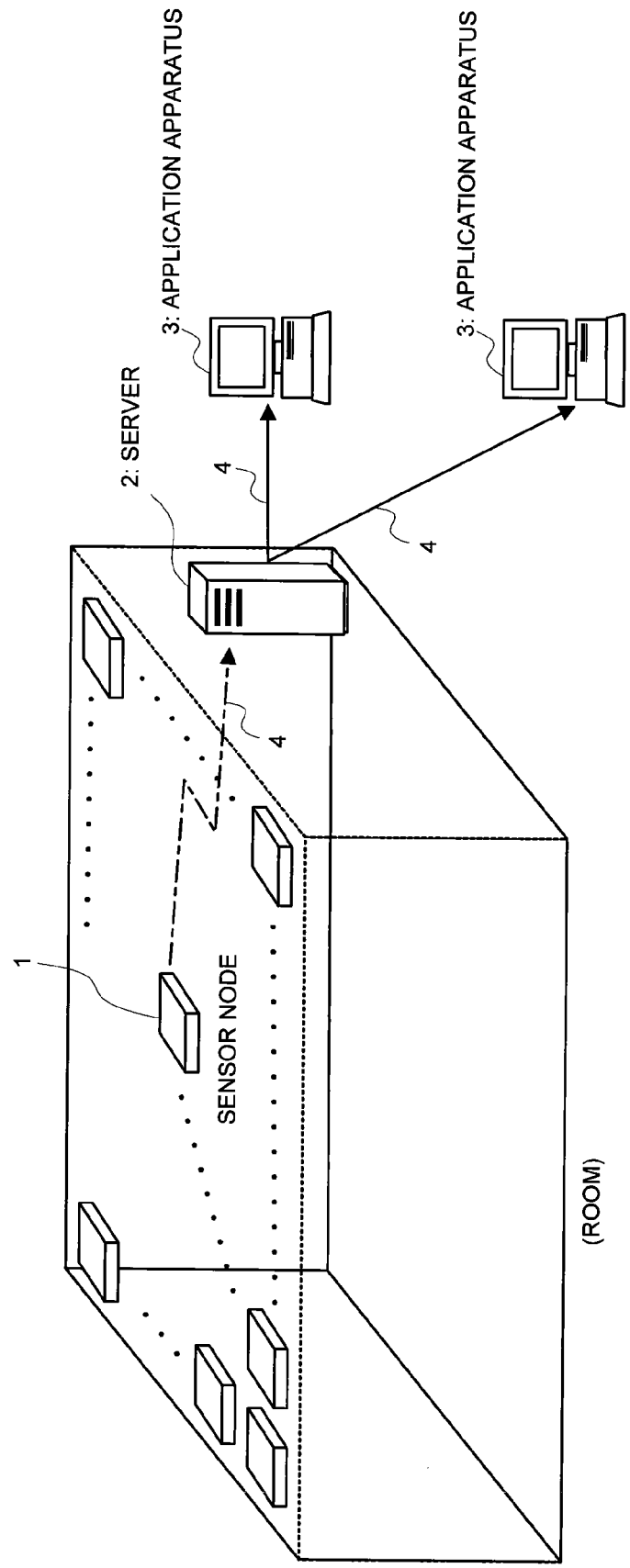
FIG. 1 is an explanatory view illustrating one configuration example of the embodiment of the sensor network system in accordance with the present invention.

A first embodiment of the present invention will be explained by making a reference to the accompanied drawings. FIG. 1 is an explanatory view illustrating one configuration example of the sensor network system in accordance with the present invention.

The first embodiment of the sensor network system in accordance with the present invention includes a plurality of sensor nodes 1 for detecting the event to transmit sensor information, being information indicating the detected event, which are installed into a room etc., a server 2 for receiving the sensor information transmitted by the sensor node 1, an application apparatus 3 for utilizing the sensor information, and a communication network 4 for connecting the sensor node 1, the server (sensor information collector) 2, and the application apparatus 3.

The sensor node 1 transmits the sensor information to the server 2 via the communication network 4. The sensor node 1, which, for example, is small-sized, has less power consumption, is driven with a battery, and is installable in plural in a space such as a room, a building, and the outdoors, has a wireless communication function in accordance with the IEEE802.11b etc.

Additionally, it is assumed that the sensor node 1 has a wireless communication function of the IEEE802.11b etc.; however it may correspond to the wireless communication technique of other specification such as ZigBee (Registered Trademark), the wire communication such as Ethernet (Registered Trademark), or the like. Further, it is assumed that the sensor node 1 is driven with a battery; however the present invention is not limited hereto, and the sensor node 1 may be driven with other power supply technique.

The server 2 receives the sensor information from the sensor node 1, and transmits a distribution of the received sensor information to the application apparatus 3 via the communication network 4. The server 2, which is generally called a sink, may play a role as a gateway, for example, administering a plurality of the sensor nodes 1, providing the application apparatus 3 information, or the like, together with reception of the sensor information.

The application apparatus 3 is an apparatus for providing various services utilizing the sensor information. The application apparatus 3 provides a user, for example, the service, being "an event distribution display service" of displaying distribution information of the event that has occurred in the room, being an object of observation, based upon the received sensor information.

Additionally, the application apparatus 3 may monitor the environment of the space having the sensor node 1 installed, and the facilities, thereby to change the service that is provided for a user, responding to the sensor information.

The communication network 4 connects the sensor node 1, the server 2, and the application apparatus 3 mutually. The communication network 4 is realized, for example, by means of the wire communication technique such as Ethernet, or the wireless communication technique such as a wireless LAN. Additionally, the communication network 4 may be separated in such a manner that the wireless communication technique is adopted for the communication network between the sensor node 1 and the server 2, the Ethernet is adopted for the communication network between the server 2 and the application apparatus 3, and so on.

Figure 2:
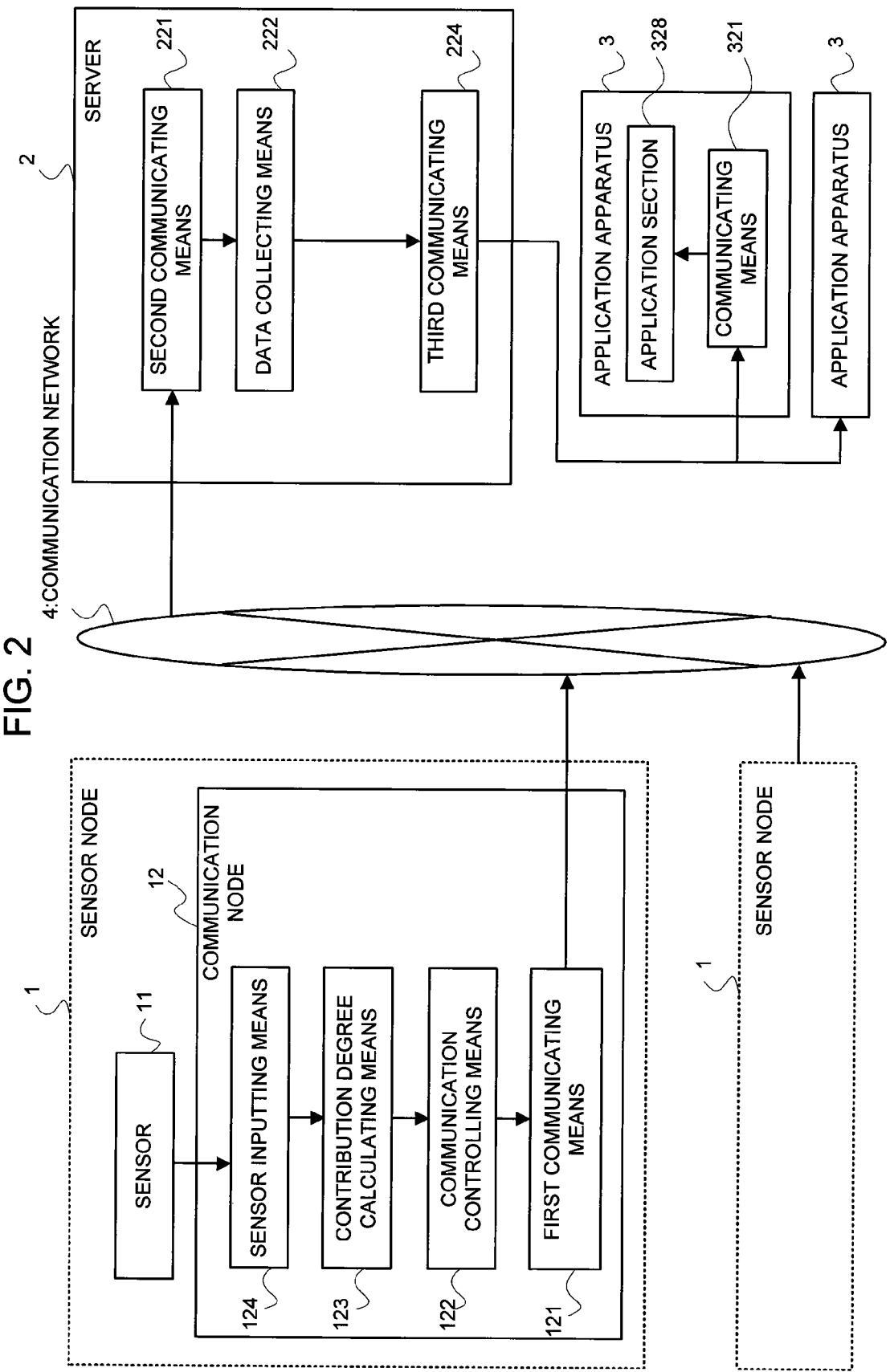
FIG. 2 is a block diagram illustrating one configuration example of a first embodiment of the sensor network system of the present invention.

FIG. 2 is a block diagram illustrating one configuration example of the first embodiment of sensor network system in accordance with the present invention.

The sensor node 1 includes a sensor 11 for detecting the event that has occurred, thereby to generate sensor information indicating the detected event, and a communication node 12 for transmitting the sensor information.

The sensor 11 has, for example, a function of measuring the physical amount such as temperature and illumination, acquiring video data, voice data, etc., monitoring the state of a person, an equipment appliance, etc. and observing the event, thereby to generate the sensor information.

The communication node 12 includes a sensor inputting means 124 for acquiring the sensor information from the sensor 11, a contribution degree calculating means 123 for calculating the contribution degree of the sensor information, a communication controlling means 122 for take a communication control based upon the contribution degree, and a first communicating means 121 for transmitting the sensor information.

The sensor inputting means 124, which has an interface with the sensor 11, acquires the sensor information generated by the sensor 11. It is acceptable that the method of acquiring the sensor information by the sensor inputting means 124 is a download-type (pull-type) method of information, a method of the technique (push-type) of receiving the sensor information asynchronously with detection of occurrence of the event by the sensor 11, or a method of the other technique. The technique of acquiring the sensor information by the sensor inputting means 124, which does not limit the applicable scope of the present invention, can be realized by means of various techniques responding to a specification, a characteristic, and a utilization purpose of the sensor 11.

The contribution degree calculating means 123 calculates the contribution degree of the sensor data. The contribution degree calculating means 123 calculates the contribution degree based upon the event model, responding to the sensor information generated by one sensor node, the past sensor information generated by its sensor node, the sensor information generated by the other sensor node, etc.

Additionally, the so-called contribution degree, which is a degree indicating a contribution of the sensor information to a distribution (data group) of the sensor information that the application apparatus 3 receives, has such a characteristic that in a case where the value of the sensor information can be easily forecasted/estimated from the distribution of the sensor information, its value becomes small (the contribution degree is low), and in a case where the forecast/estimation is difficult, its value becomes large (the contribution degree is high). In the present invention, this contribution degree allows a degree of an influence that one item of the sensor information exerts upon a precision (resolution) of the entirety of the contribution of the sensor information to be sounded, and the communication controlling means 122 to take a communication control.

Further, the so-called event model signifies what is obtained by making a modeling for the event that is an object of observation. That is, the so-called event model is represented by a numerical equation expressing a relation between the value of each sensor information and that of the other, a relational equation that satisfies the probability distribution in having assumed the value of the sensor information to be a probability variable, or the like, and the optimum event model is set, based upon the event that is an object of observation by the sensor network system, an arrangement of the sensor node, etc. And, the contribution degree calculating means 123 calculates the contribution degree on the hypothesis that the event occurs based upon the event model.

The communication controlling means 122 retains the communication control condition, and decides a communication control technique based upon the contribution degree and the communication control condition.

Additionally, the so-called communication control technique signifies the technique of controlling the transmission timing such as delayed transmission, suspension of transmission, and periodical transmission. And, the technique best suited for an improvement in a precision of the sensor information and a reduction in a traffic quantity is selected/decided on the basis of the contribution degree and the communication control condition.

And, the so-called communication control condition is an algorithm for deciding the communication control technique and its parameter. With the communication control technique, for example, the sensor information having a large contribution degree, to which the delayed transmission is applied as the communication control condition, has a small delay time set, and the sensor information having a small contribution degree, to which the delayed transmission is applied as the communication control condition, has a large delay time set. Further, the sensor information having an extremely low contribution degree is set so that it is not transmitted. That is, the sensor information having a large contribution degree is preferentially transmitted. Additionally, a bandwidth, a traffic, etc. of the communication network 4 may be utilized as the communication control condition As the communication control condition, for example, the contribution degree of the sensor information is compared with a predetermined value thereof, if the former is larger than the latter, a small delay time is set to its sensor information in some cases, and its sensor information is preferentially transmitted in some cases, and if the former is smaller than the latter, a large delay time is set to its sensor information. Making such a configuration enables the sensor information having a large contribution degree to be transmitted more preferentially than the sensor information having a small contribution degree. Further, it is also acceptable that the predetermined value with which the contribution degree is compared is a value that is calculated with a predetermined equation. Further, the value calculated by applying the contribution degree to a predetermined equation may be compared with a predetermined value, a random value, or the like.

The first communicating means 121 of the communication node 12 of the sensor node 1 transmits the sensor information to the server 2 via the communication network 4. Further, the first communicating means 121 may transmit not only the sensor information but also the communication control information such as the contribution degree, the communication control technique, and its parameter, and additional information such as the measurement time and the term of validity. Further, the first communicating means 121 may receive the sensor information transmitted via the communication network 4 by the other sensor node to input it into the contribution degree calculating means 123, thereby to allow the contribution degree calculating means 123 to utilize it for the condition for calculating the contribution degree. Further, the first communicating means 121 may measure the traffic quantity of the communication network 4 to input the measured traffic quantity into the communication controlling means 122, thereby to allow the communication controlling means 122 to utilize it as one of the communication control conditions.

The server 2 includes a second communicating means 221 for receiving the sensor information, a data collecting means 222 for collecting the sensor information, and a third communicating means (sensor information distribution transmitting means) 224 for transmitting information indicating the distribution of the sensor information to the application apparatus 3.

The second communicating means 221 receives the sensor information from a plurality of the sensor nodes 1 via the communication network 4.

The data collecting means 222 collects the sensor information received by the second communicating means 221, and retains/administers an arrangement thereof etc. in a storage medium such a memory as an aggregation (distribution of the sensor information) in order to facilitate the statistical process etc. That is, the data collecting means 222 generates information indicating the distribution of the sensor information based upon the sensor information received by the second communicating means 221. Hereinafter, this aggregation (information indicating the distribution of the sensor information) is referred to as a sensor information distribution. The third communicating means 224 transmits the sensor information distribution to the application apparatus 3.

The application apparatus 3 includes a communicating means 321 for receiving the sensor information distribution, and an application section 328 for executing application software.

The communicating means 321 receives the sensor information distribution from the server 2. The application section 328 executes the application software utilizing the sensor information distribution.

The sensor node 1 has a sensor node program installed, which is characterized in causing a computer to perform a process of more preferentially transmitting the sensor information indicating the event detected by the sensor that exerts a larger influence upon the sensor information distribution indicating the temporal distribution or spatial distribution of the event.

The server 2 has a sensor information collection program installed, which is characterized in causing a computer to perform a data collection process of generating the sensor information distribution indicating the temporal or spatial distribution of the event, based upon the received sensor information.

Figure 3:
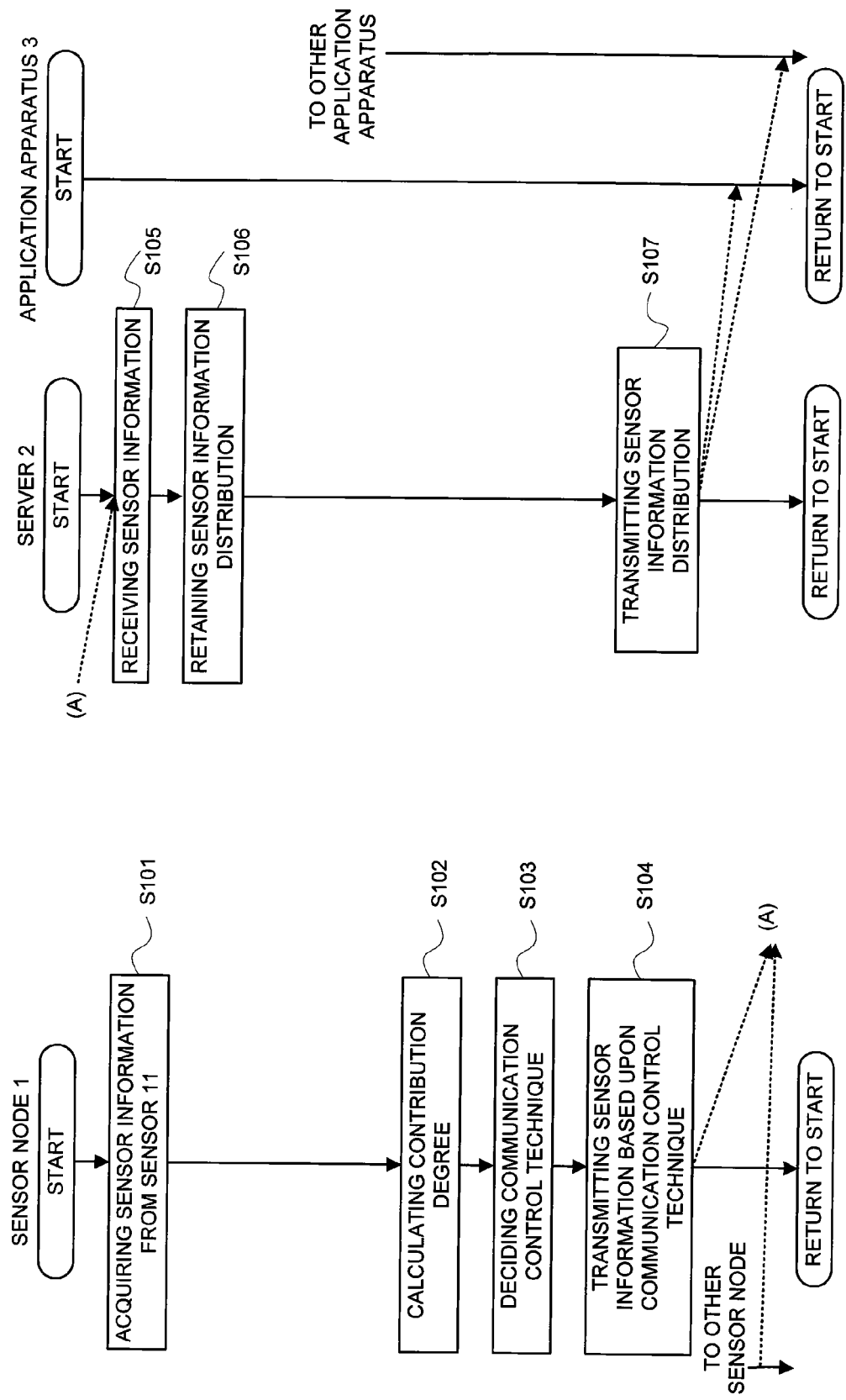
FIG. 3 is a sequence view for explaining an operation of the first embodiment of the present invention.

Next, an operation of the first embodiment of the present invention will be explained by making a reference to the accompanied drawings. FIG. 3 is a sequence view for explaining the operation of the first embodiment.

The sensor 11 of the sensor node 1 detects the event that has occurred, and generates the sensor information indicating the detected event. The sensor inputting means 124 acquires the sensor information from the sensor 11 (Step S101) and inputs it into the contribution degree calculating means 123.

The contribution degree calculating means 123 calculates the contribution degree of the sensor information to the sensor information distribution based upon the set event model, responding to the probability that the event, which the input sensor information indicates, occurs, or the degree at which the sensor information can be forecasted/estimated (step S102).

The communication controlling means 122 decides the communication control technique that is best suited for preferentially transmitting the sensor information having a large contribution degree based upon the contribution degree calculated by the contribution degree calculating means 123, and the communication control condition (step S103).

The first communicating means 121 transmits the sensor information to the server 2 based upon the communication control technique decided by the communication controlling means 122 (step S104).

The second communicating means 221 of the server 2 receives the sensor information from the sensor node 1 (step S105). The data collecting means 222 retains the sensor information received by the second communicating means 221 from each sensor node 1 as the sensor information distribution (step S106).

The third communicating means 224 transmits the sensor information distribution to the application apparatus 3 (step S107).

The communicating means 321 of the application apparatus 3 receives the sensor information distribution from the server 2. The application section 328 executes the application software utilizing the sensor information distribution, and processes the sensor information distribution received by the communicating means 321.

As described above, this embodiment makes it possible to configure the sensor information distribution, which the application apparatus 3 obtains, of the sensor information of which the contribution degree is large (the information quantity is much) because the sensor node 1 is configured to preferentially transmit the sensor information of which the contribution degree is large. Further, the traffic quantity of the communication network 4 can be curtailed, whereby with the sensor information distribution, the deficient data due to the congestion etc. can be decreased in the region in which a high precision and resolution is required.

Further, in accordance with this embodiment, the sensor node 1 is configured to preferentially transmit the sensor information having a large contribution degree, thereby allowing the timing at which the sensor information is transmitted, and the sensor node for transmitting the sensor information to be dispersed. For this, the transmission of the sensor information is dispersed temporally and spatially, which enables occurrence of the response implosion problem to be avoided.

Embodiment 2

Figure 4:
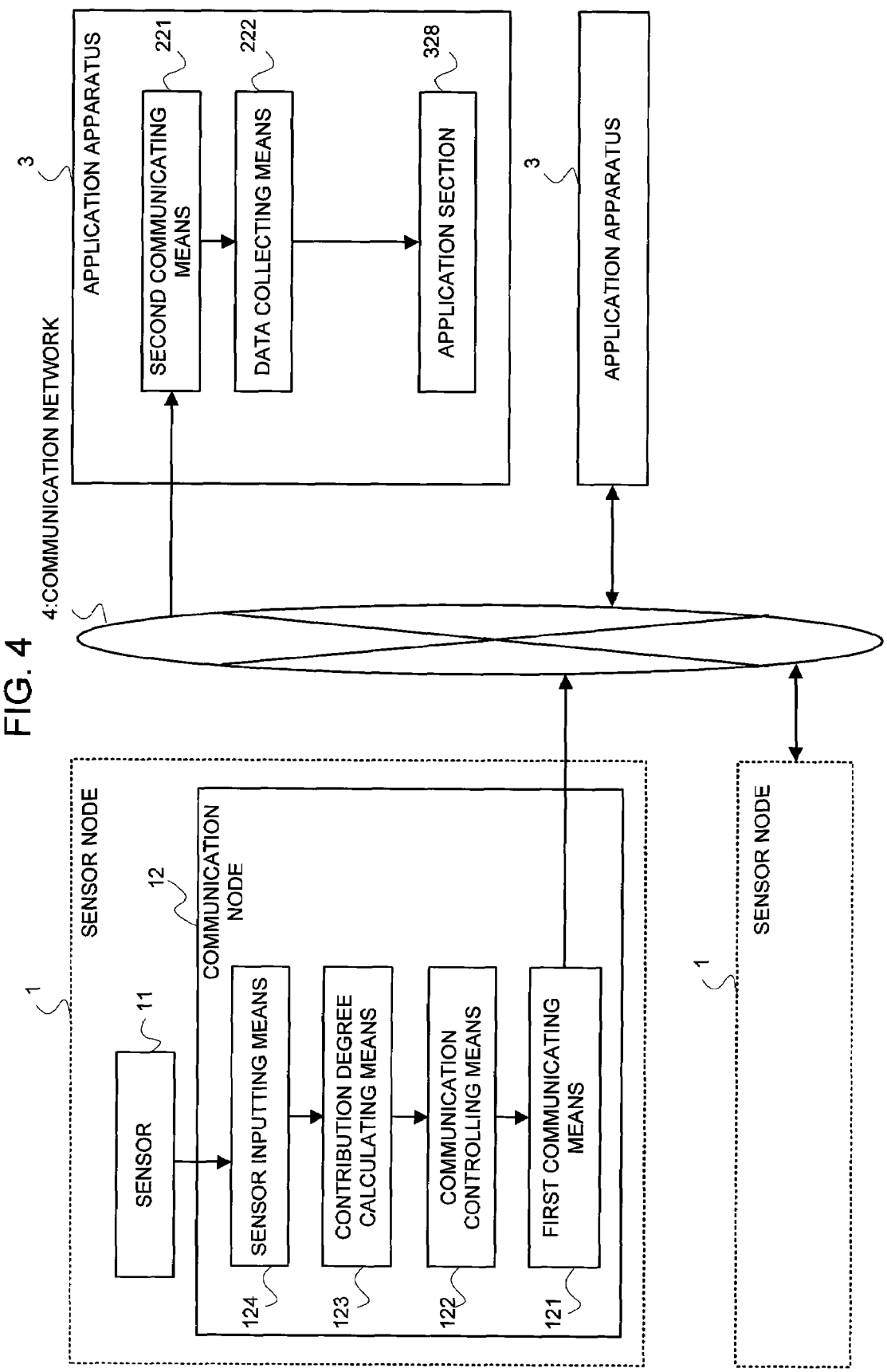
FIG. 4 is a block diagram illustrating one configuration example of a second embodiment.

Next, a second embodiment of the present invention will be explained by making a reference to the accompanied drawings. FIG. 4 is a block diagram illustrating one configuration example of the second embodiment of the present invention.

The configuration of the second embodiment of the present invention differs from that of the first embodiment shown in FIG. 2 in a point that the former does not include the server 2, but includes a plurality of application apparatuses (sensor information collectors) 3 each having a second communicating means 221 for receiving the sensor information from the sensor node 1, a data collecting means 222, and an application section 328. The configuration other than this is similar to that of the first embodiment, so the identical code to that of FIG. 2 is affixed hereto, and explanation is omitted.

In this embodiment, the sensor node 1 does not make many-to-one communication with the server 2, but makes many-to-many communication with a plurality of the application apparatuses 3.

The application apparatus 3 has the sensor information collection program installed, which is characterized in causing the computer to perform a data collection process of generating the sensor information distribution indicating the temporal distribution or spatial distribution of the event based upon the received sensor information.

An operation of the second embodiment of the present invention will be explained. The operation of each means of this embodiment is similar to that of each means in the first embodiment, so explanation is omitted.

In the first embodiment, the server 2 collects the sensor information transmitted by the sensor node 1, and delivers the sensor information distribution to each application apparatus 3. On the other hand, in this embodiment, the sensor node 1 transmits the sensor information directly to the application apparatus 3, and the data collecting means 222 of each application apparatus 3 generates the sensor information distribution. As mentioned above, this embodiment enables occurrence of the response implosion problem to be avoided, and the precision (resolution) of the sensor information distribution to be enhanced similarly to the first embodiment.

Further, in accordance with this embodiment, the sensor node 1 is in direct communication with all application apparatuses 3. This makes it possible to change/customize the operation of the data collecting means 222 for each application apparatus 3, and to process the sensor information responding to a demand of each kind of application software installed in each application apparatus 3.

Embodiment 3

Figure 5:
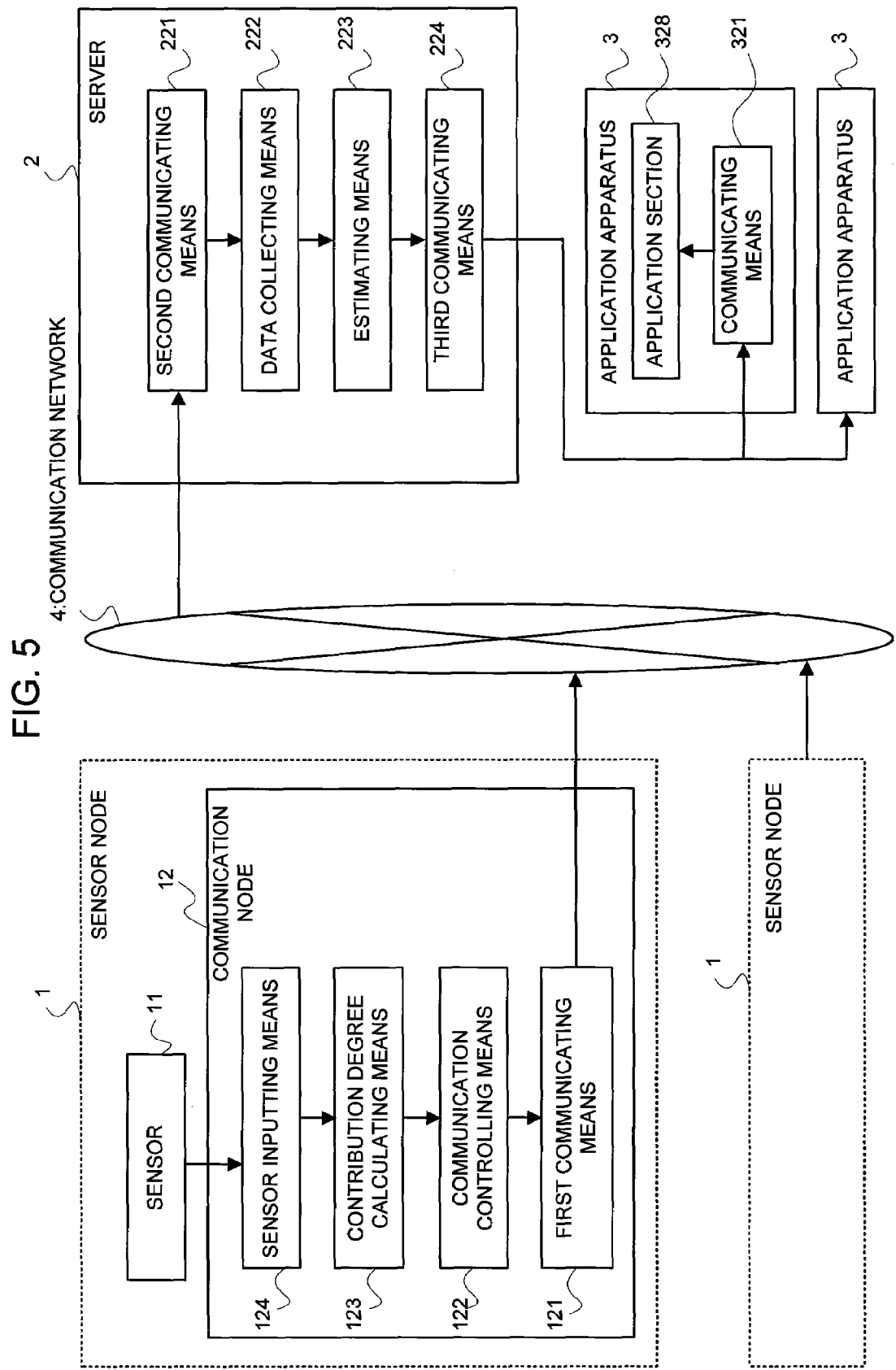
FIG. 5 is a block diagram illustrating one configuration example of a third embodiment.

Next, a third embodiment of the present invention will be explained by making a reference to the accompanied drawings. FIG. 5 is a block diagram illustrating one configuration example of the third embodiment of the present invention.

The configuration of this embodiment differs from that of the first embodiment shown in FIG. 2 in a point that the server 2 has an estimating means 223. The configuration other than this is similar to that of the first embodiment, so the identical code to that of FIG. 2 is affixed hereto, and explanation is omitted.

The estimating means 223 forecasts/estimates/complements the sensor information that is deficient, estimates the latest sensor information, thereby to restore the sensor information distribution based upon the event model, from the information (including the contribution degree, the communication control information, and the additional information such as the term of validity) associated with the sensor except the sensor information that is deficient, and the past sensor information (including the contribution degree, the communication control information, and the additional information such as the term of validity). Additionally, estimating the sensor information that is deficient, thereby to generate the sensor information distribution is referred to as restoration of the sensor information distribution.

Additionally, the so-called deficient sensor information is sensor information that the server 2 has not received yet due to a fault etc. in the sensor node 1 or the communication network 4, sensor information of which the validity term expired, or sensor information destroyed for some reason or other. Further, the estimating means 223 estimates the latest sensor information when there exists no sensor information that is regarded as the latest one and is reliable at this time point.

Figure 6:
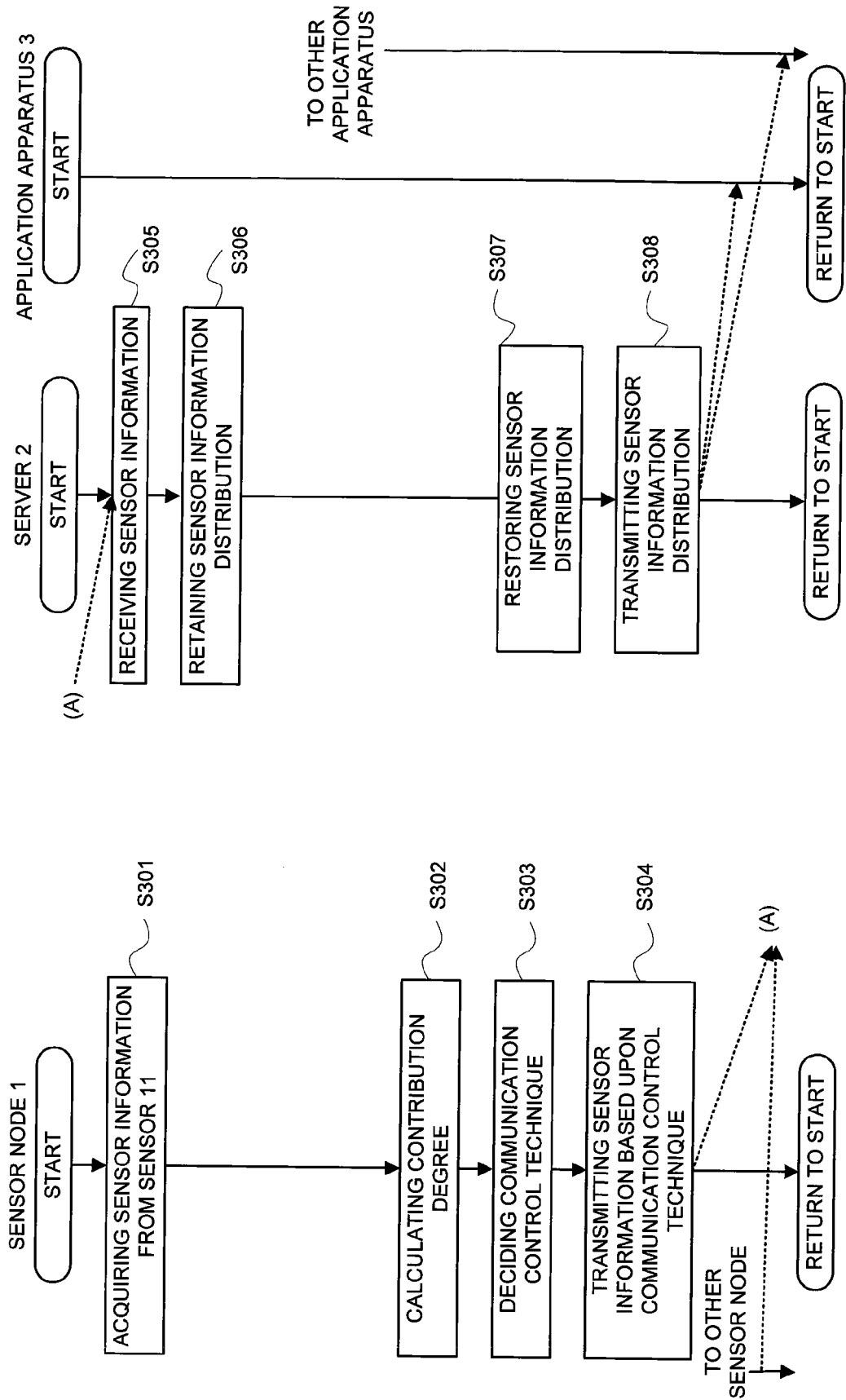
FIG. 6 is a sequence view for explaining an operation of the third embodiment.

Next, an operation of the third embodiment of the present invention will be explained by making a reference to the accompanied drawings. FIG. 6 is a sequence view for explaining the operation of the third embodiment of the present invention.

The sensor 11 of the sensor node 1 detects the event that has occurred, and generates the sensor information indicating the detected event. The sensor inputting means 124 acquires the sensor information from the sensor 11 (step S301), and inputs it into the contribution degree calculating means 123.

The contribution degree calculating means 123 calculates the contribution degree of the sensor information to the sensor information distribution based upon the set event model, responding to the probability that the event, which the input sensor information indicates, occurs, or the degree at which the sensor information can be forecasted/estimated, (step S302).

The communication controlling means 122 decides the communication control technique that is best suited for preferentially transmitting the sensor information having a large contribution degree based upon the contribution degree calculated by the contribution degree calculating means 123, and the communication control condition (step S303).

The first communicating means 121 transmits the sensor information to the server 2 based upon the communication control technique decided by the communication controlling means 122 (step S304).

The second communicating means 221 of the server 2 receives the sensor information from the sensor node 1 (step S305). The data collecting means 222 retains the sensor information received by the second communicating means 221 from each sensor node 1 as the sensor information distribution (step S306), and outputs it to the estimating means 223 as the sensor information distribution. The estimating means 223 forecasts/estimates/complements the sensor information that is deficient, thereby to restore the latest sensor information distribution based upon the event model, from the past sensor information etc. (step S307).

The third communicating means 224 transmits the restored sensor information distribution to the application apparatus 3 (step S308).

The communicating means 321 of the application apparatus 3 receives the sensor information distribution from the server 2. The application section 328 executes the application software utilizing the sensor information distribution, and processes the sensor information distribution received by the communicating means 321.

As mentioned above, this embodiment makes it possible to decrease the deficient data in the region, in which, with the sensor information distribution, the high precision and resolution is required, similarly to the first embodiment. For this, even in a case where the deficient data has existed, it is possible to enhance the possibility that the estimating means 223 succeeds in forecasting/estimating/complementing the deficient data, thereby to restore the sensor information distribution.

Further, in this embodiment, the estimating means 223 forecasts/estimates/complements the deficient data, thereby to restore the sensor information distribution. This enables the sensor network system of this embodiment to provide the sensor information distribution without the deficit (low precision/low resolution) due to non-arrival of the sensor information. That is, it is possible to provide the sensor information distribution expressed at the maximum precision (resolution) of the sensor network system.

Embodiment 4

Figure 7:
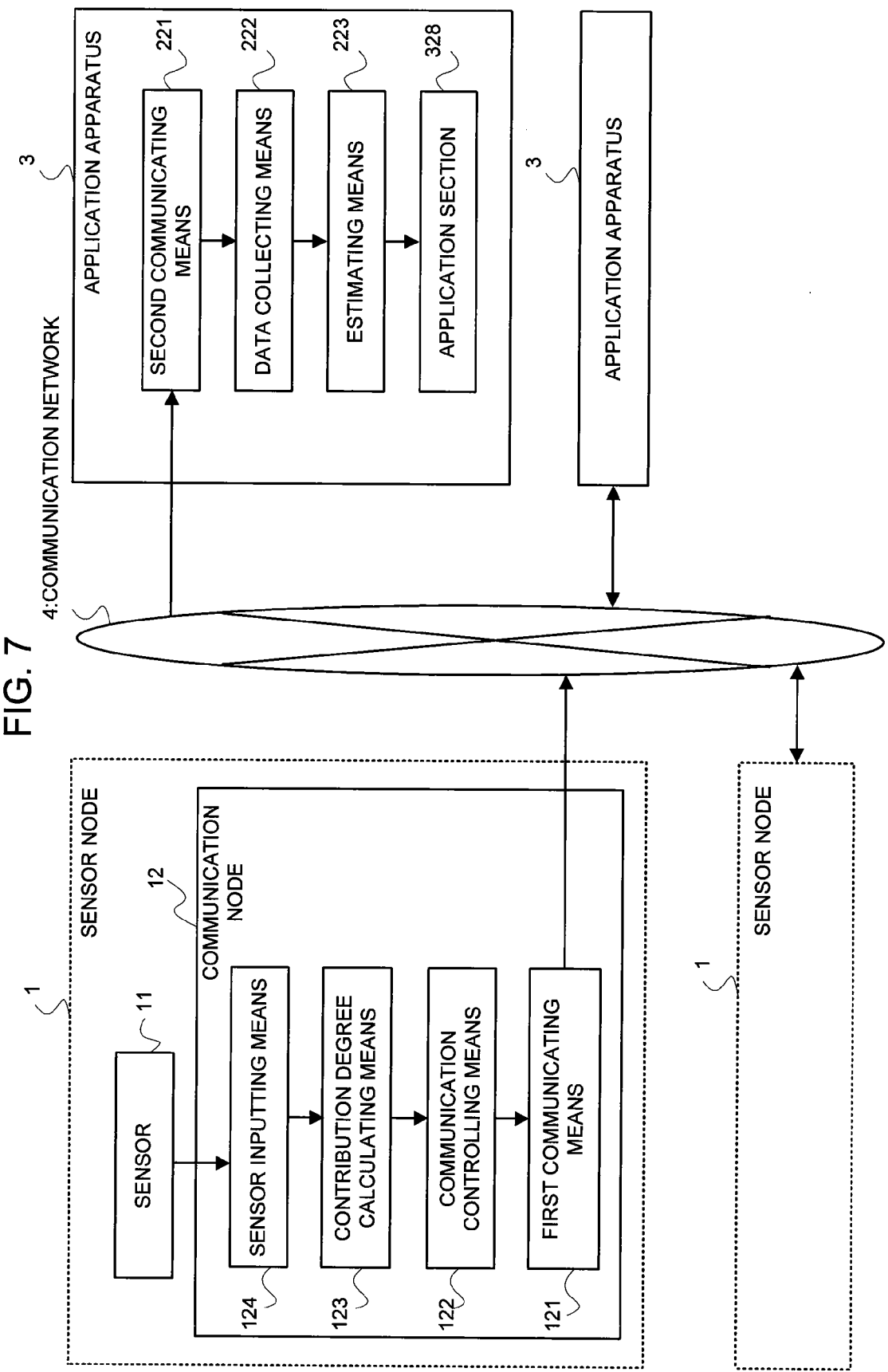
FIG. 7 is a block diagram illustrating one configuration example of a fourth embodiment.

Next, a fourth embodiment of the present invention will be explained by making a reference to the accompanied drawings. FIG. 7 is a block diagram illustrating one configuration example of the fourth embodiment of the present invention.

The configuration of this embodiment differs from that of the second embodiment shown in FIG. 4 in a point that the application apparatus 3 has an estimating means 223.

The configuration other than this is similar to that of the second embodiment, so the identical code to that of FIG. 4 is affixed hereto, and explanation is omitted.

The operation of each means of this embodiment is similar to that of each means in the fourth embodiment, so explanation is omitted. Additionally, the operation of the estimating means 223 is similar to that of the estimating means 223 in the third embodiment, so explanation is omitted.

As mentioned above, this embodiment enables occurrence of the response implosion problem to be avoided, and the precision (resolution) of the sensor information distribution to be enhanced similarly to the first embodiment.

Further, similarly to the second embodiment, it becomes possible to change/customize the operation of the data collecting means 222 for each application apparatus 3. Further, similarly to the third embodiment, the estimating means 223 can restore the sensor information distribution.

Embodiment 5

Figure 8:
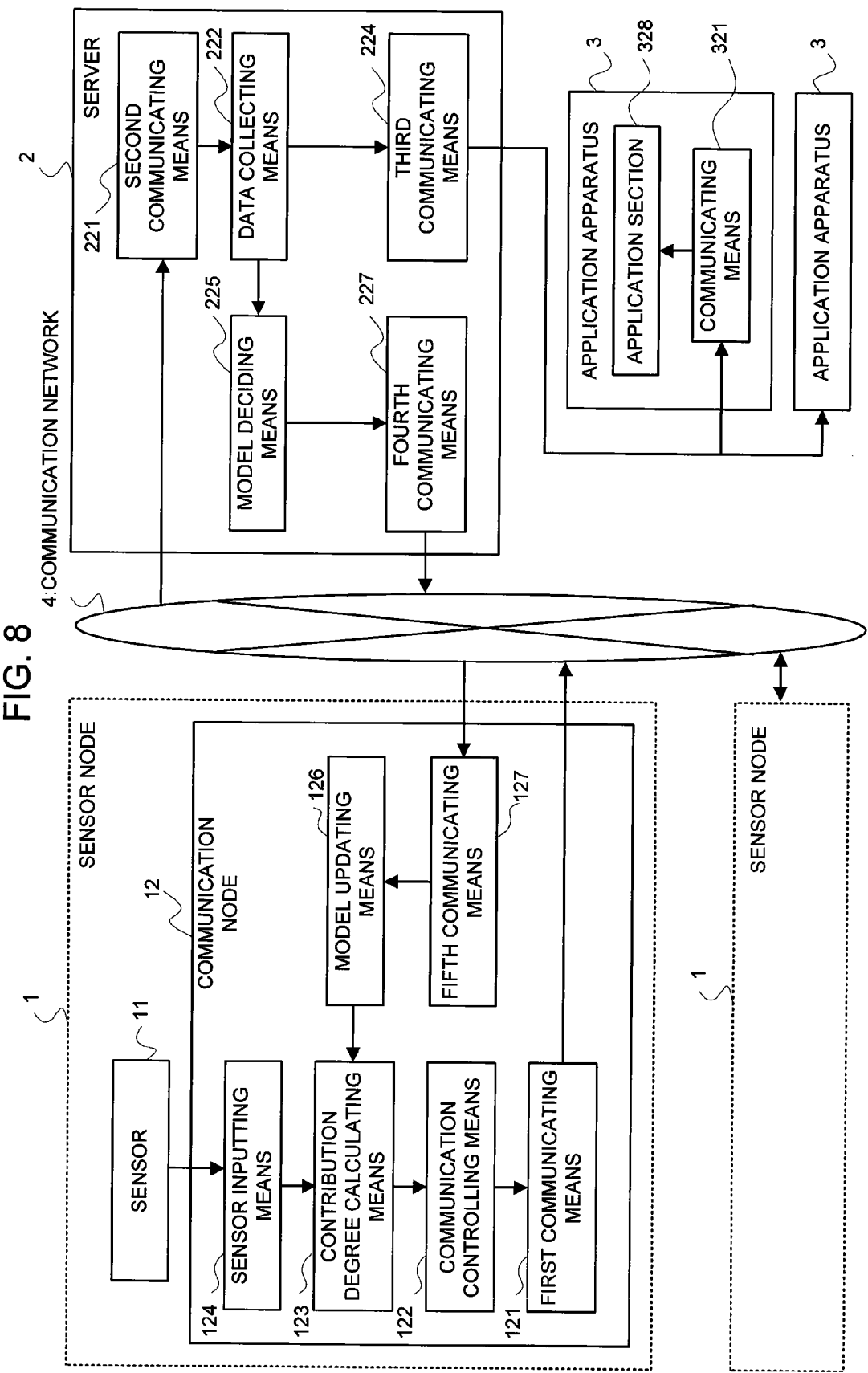
FIG. 8 is a block diagram illustrating one configuration example of a fifth embodiment.

Next, a fifth embodiment of the present invention will be explained by making a reference to the accompanied drawings. FIG. 8 is a block diagram illustrating one configuration example of the fifth embodiment of the present invention.

The configuration of this embodiment differs from that of the first embodiment shown in FIG. 2 in a point that the sensor node 1 includes a model updating means 126 for updating the event model set in the contribution degree calculating means 123, and a fifth communicating means 127 for receiving information from the server 2, and that the server 2 includes a model deciding means 225 for deciding the event model that is set in the contribution degree calculating means 123, and a fourth communicating means 227 for transmitting information to the sensor node 1. The configuration other than this is similar to that of the first embodiment, so the identical code to that of FIG. 2 is affixed hereto, and explanation is omitted.

The model deciding means 225 decides the event model based upon the sensor information distribution, and generates updated event model information indicating the decided event model.

Additionally, the so-called decision of the event model is an operation of obtaining the parameter in the event model so that the event model represents the event most suitably (it is expressed in a relational equation between items of data (events) that the sensor information indicates, a relational equation that satisfies the probability distribution, or the like). Additionally, the optimum event model may be selected from among a plurality of selectable event models.

Specifically, for example, in a case of having adopted the event model saying that data, which a certain item of sensor information indicates, has a correlation with data, which the neighboring sensor information indicates, and that the probability that it has the identical value to that of data that the neighboring sensor information indicates is high, the model deciding means 225 obtains a correlation between items of data that the sensor information including the sensor information distribution indicate.

The so-called obtaining of a correlation between items of data that the sensor information indicate is, for example, to obtain a ratio (probability) of the number of the data, which is indicated by the sensor information having an identical value to that of data that is indicated by four items of the neighboring sensor information, over the entirety of the sensor information distribution.

And, the model deciding means 225 assumes that the obtaining of the probability value is a decision of the event model, and generates its probability value as updated event model information.

Additionally, in this explanation, the decision of the event model is carried out, based upon the correlation between items of data (events) that the neighboring sensor information indicates (the probability that the data has the identical value); however the present invention is not limited hereto, and the event model may be decided with the other method.

The so-called updated event model information is a parameter that characterizes the event model, or a numerical equation/a figure/other information that expresses the event model. That is, the updated event model information is not a microscopic parameter that characterizes the event in individual sensor nodes 1, but a macroscopic parameter that characterizes the event entirely.

Accordingly, the updated event model information has less data quantity as compared with the case of being a microscopic parameter that characterizes the event in individual sensor nodes 1, and the data quantity of the updated event model information, which is transmitted from the server 2 to the sensor node 1, is little.

The fourth communicating means 227 transmits the updated event model information to sensor node 1. Further, the fifth communicating means 127 receives the updated event model information from the server 2. The model updating means 126 updates the event model set in the contribution degree calculating means 123, based upon the updated event model information.

Additionally, the so-called update of the event model set in the contribution degree calculating means 123, which is to change the event model set herein, is to change the numerical equation set as the event model in the contribution degree calculating means 123 in some cases, to change the parameter of the numerical equation in some cases, and to change the figure in some cases.

Figure 9:
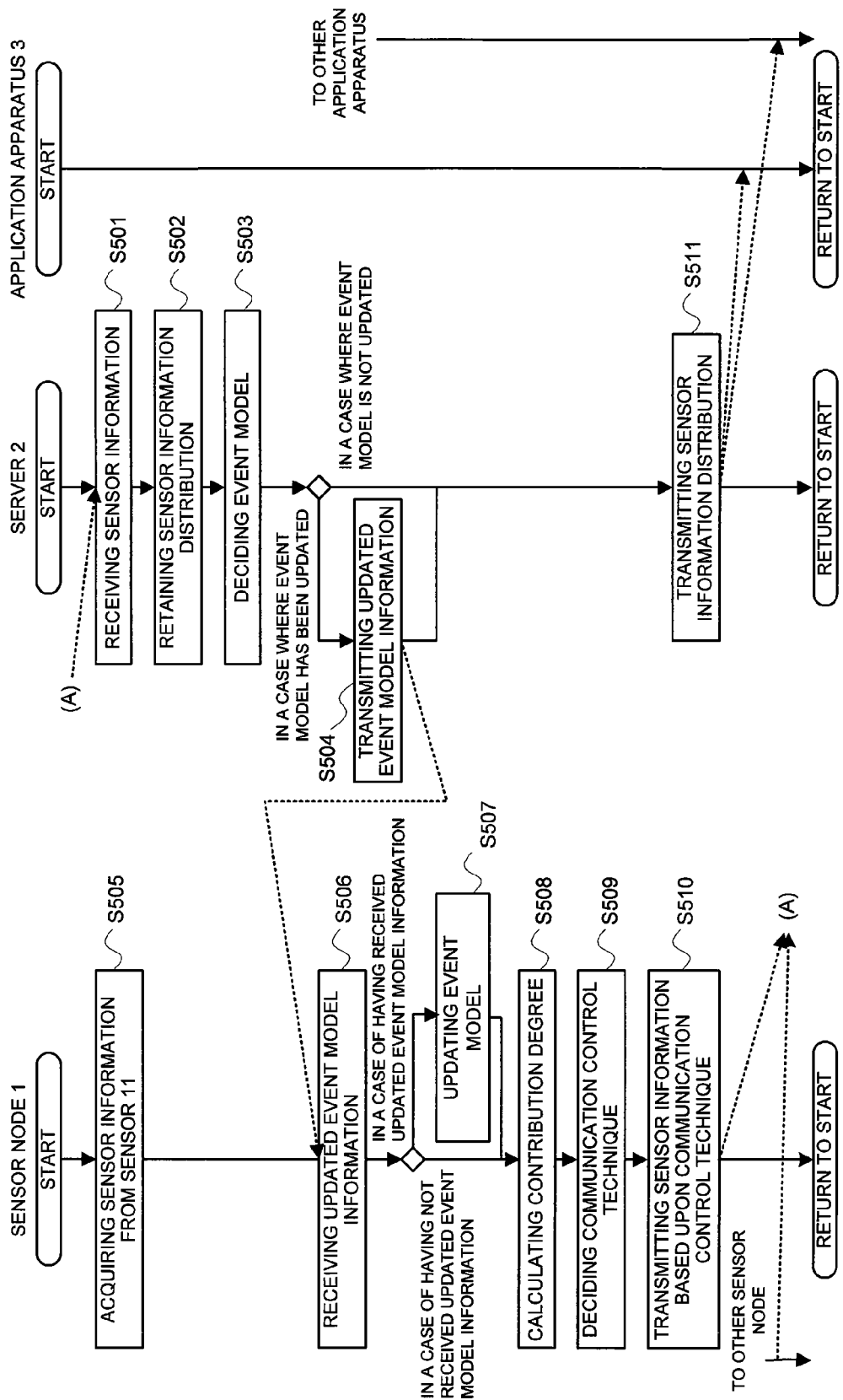
FIG. 9 is a sequence view for explaining an operation of the fifth embodiment.

Next, an operation of the fifth embodiment of the present invention will be explained by making a reference to the accompanied drawings. FIG. 9 is a sequence view for explaining the operation of the fifth embodiment of the present invention.

When the second communicating means 221 of the server 2 receives the sensor information from the sensor node 1 (step S501), the data collecting means 222 retains the sensor information received from each sensor node 1 by the second communicating means 221 as the sensor information distribution (step S502).

The model deciding means 225 decides the event model based upon the sensor information distribution (step S503). When the event model is updated, the fourth communicating means 227 transmits the updated event model information to the sensor node 1 (step S504).

The sensor 11 of the sensor node 1 detects the event that has occurred, and generates the sensor information indicating the detected event. The sensor inputting means 124 acquires the sensor information from the sensor 11 (step S505), and inputs it into the contribution degree calculating means 123.

When the fifth communicating means 127 receives the updated event model information from the server 2 (step S506), the model updating means 126 updates the event model set in the contribution degree calculating means 123 (step S507).

The contribution degree calculating means 123 calculates the contribution degree of the sensor information to the distribution of the sensor information based upon the set event model, responding to the probability that the event, which the input sensor information indicates, occurs, or the degree at which the sensor information can be forecasted/estimated (step S508).

The communication controlling means 122 decides the communication control technique that is best suited for preferentially transmitting the sensor information having a large contribution degree, based upon the contribution degree calculated by the contribution degree calculating means 123 and the communication control condition (step S509).

The first communicating means 121 transmits the sensor information to the server 2 according to the communication control technique decided by the communication controlling means 122 (step S510).

Further, the third communicating means 224 transmits the sensor information distribution retained by the data collecting means 222 in the step S502 to the application apparatus 3 (step S511).

The communicating means 321 of the application apparatus 3 receives the sensor information distribution from the server 2. The application section 328 executes the application software utilizing the sensor information distribution, and processes the sensor information distribution received by the communicating means 321.

As mentioned above, this embodiment enables occurrence of the response implosion problem to be avoided and the precision (resolution) of the sensor information distribution to be enhanced similarly to the first embodiment.

Further, in accordance with this embodiment, the model deciding means 225 updates the event model that is employed for calculating the contribution degree, and modifies the event model into the model that corresponds to the actual event. For this, it is possible to follow in the wake of a change/transition of the event model, which the event that actually has occurred follows, and to calculate the contribution degree of which the precision is higher (more effective).

Further, the decision of the event model and the update of the event model are repeated, whereby setting the initial event model in the beginning enables the event model to approach the true event model even though the event model is unknown. For this, also in a case where the event model is unknown, it is possible to avoid occurrence of the response implosion problem and to enhance the precision (resolution) of the sensor information distribution.

Embodiment 6

Figure 10:
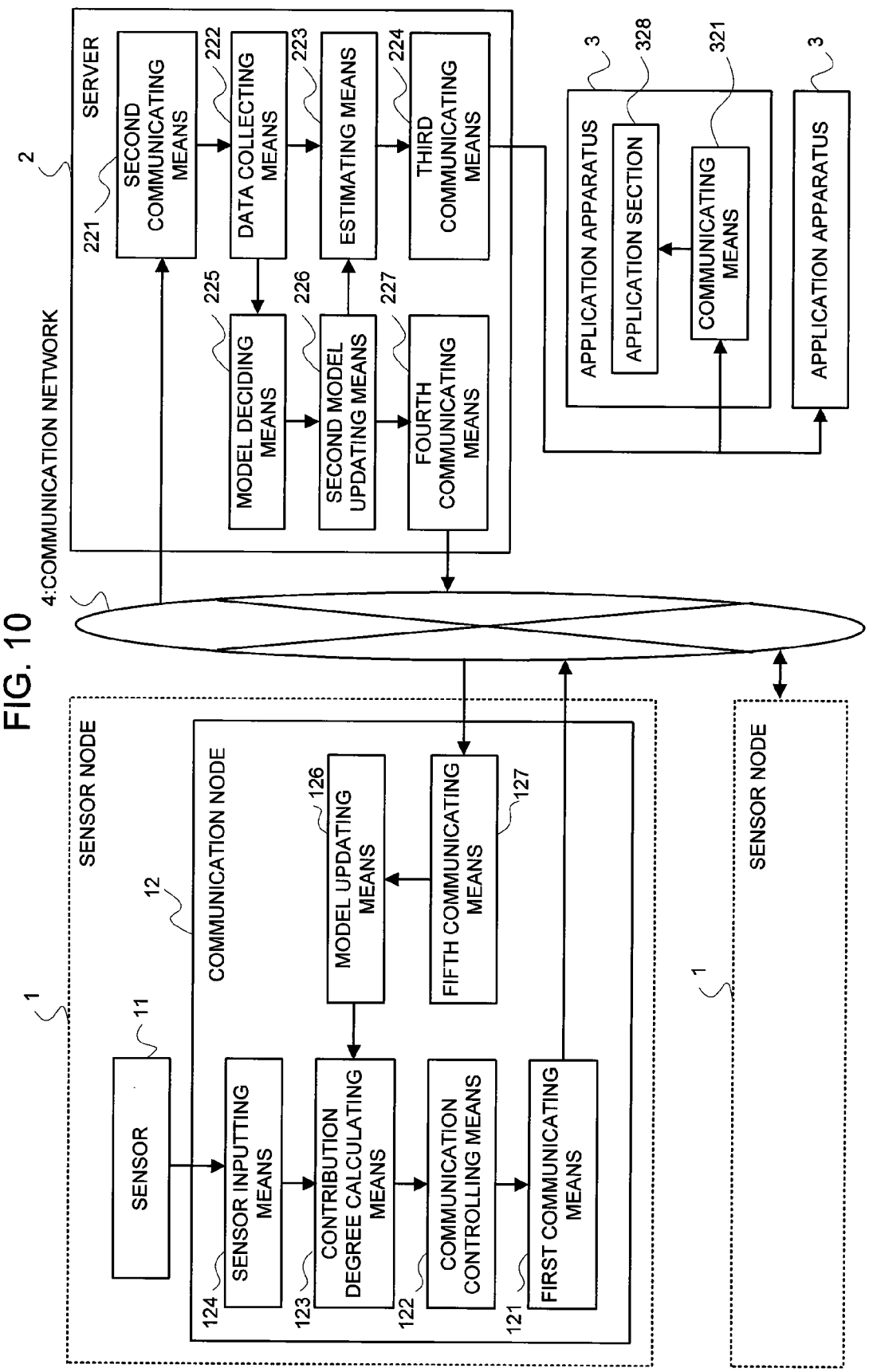
FIG. 10 is a block diagram illustrating one configuration example of a sixth embodiment.

Next, a sixth embodiment of the present invention will be explained by making a reference to the accompanied drawings. FIG. 10 is a block diagram illustrating one configuration example of the sixth embodiment of the present invention.

The configuration of this embodiment differs from that of the fifth embodiment shown in FIG. 8 in a point that the server 2 has an estimating means 223 and a second model updating means (model setting means) 226. The configuration other than this is similar to that of the fifth embodiment, so the identical code to that of FIG. 8 is affixed hereto, and explanation is omitted.

The operation of the estimating means 223 is similar to that of the third embodiment shown in FIG. 3, so explanation is omitted.

The second model updating means 226 updates the event model set in the estimating means 223, based upon the updated event model information.

Figure 11:
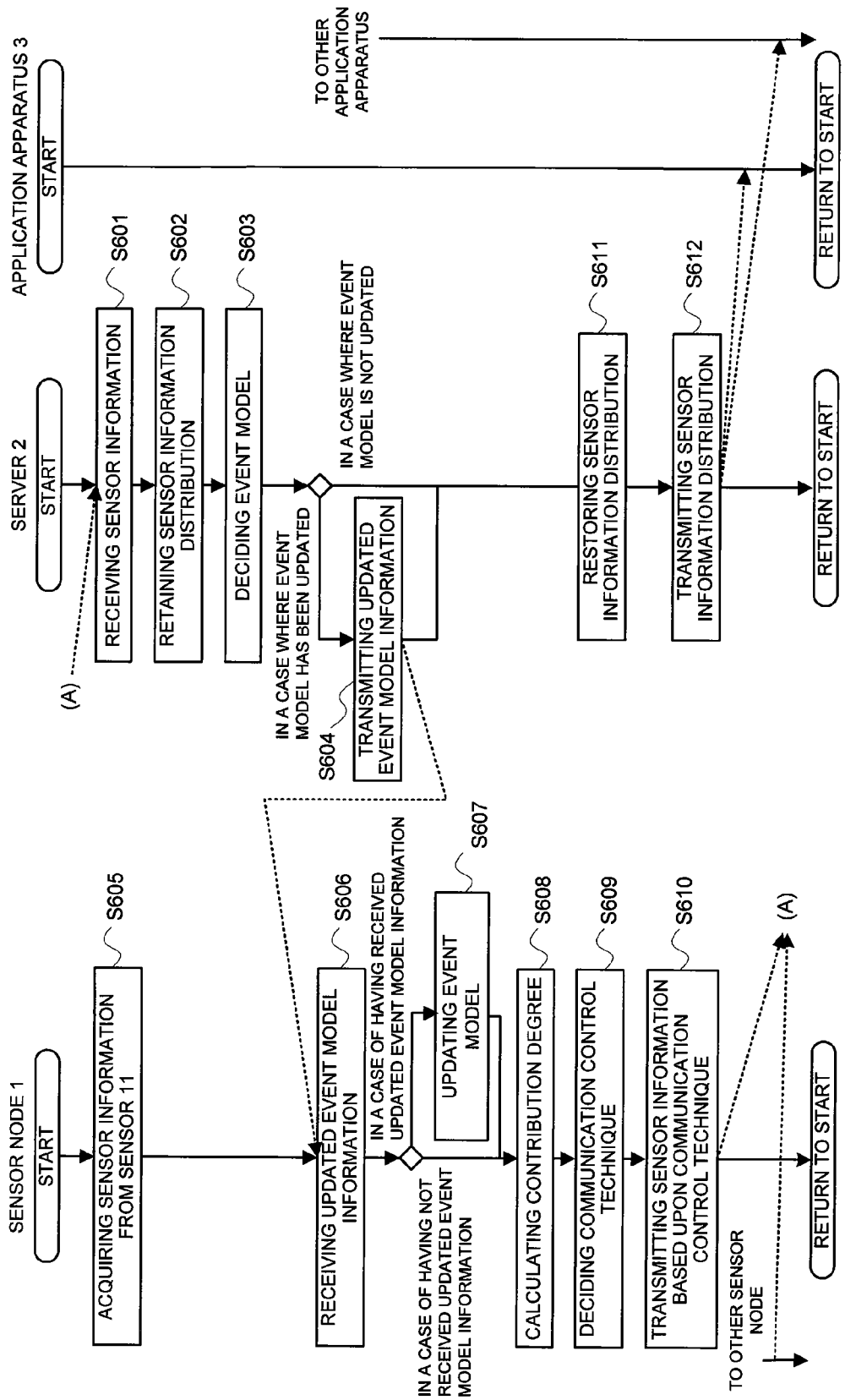
FIG. 11 is a sequence view for explaining an operation of the sixth embodiment.

Next, an operation of the sixth embodiment of the present invention will be explained by making a reference to the accompanied drawings. FIG. 11 is a sequence view for explaining the operation of the sixth embodiment of the present invention.

The second communicating means 221 of the server 2 receives the sensor information from the sensor node 1 (step S601). The data collecting means 222 retains the sensor information received from each sensor node 1 by the second communicating means 221 as the sensor information distribution (step S602).

The model deciding means 225 decides the event model based upon the sensor information distribution (step S603) When the event model is updated, the fourth communicating means 227 transmits the updated event model information to the sensor node 1 (step S604).

The sensor 11 of the sensor node 1 detects the event that has occurred, and generates the sensor information indicating the detected event. The sensor inputting means 124 acquires the sensor information from the sensor 11 (step S605), and inputs it into the contribution degree calculating means 123.

When the fifth communicating means 127 receives the updated event model information from the server 2 (step S606), the model updating means 126 updates the event model set in the contribution degree calculating means 123 (step S607).

The contribution degree calculating means 123 calculates the contribution degree of the sensor information to the distribution of the sensor information based upon the set event model, responding to the probability that the event, which the input sensor information indicates, occurs, or the degree at which the sensor information can be forecast/estimated (step S608).

The communication controlling means 122 decides the communication control technique that is best suited for preferentially transmitting the sensor information having a large contribution degree, based upon the contribution degree calculated by the contribution degree calculating means 123 and the communication control condition (step S609).

The first communicating means 121 transmits the sensor information to the server 2 according to the communication control technique decided by the communication controlling means 122 (step S610).

Further, the estimating means 223 of the server 2 forecasts/estimates/complements the sensor information that is deficient, thereby to restore the latest sensor information distribution based upon the event model, from the sensor information distribution retained in the step S602, the past sensor information, etc. (step S611).

The third communicating means 224 transmits the restored sensor information distribution to the application apparatus 3 (step S612).

The communicating means 321 of the application apparatus 3 receives the sensor information distribution from the server 2. The application section 328 executes the application software utilizing the sensor information distribution, and processes the sensor information distribution received by the communicating means 321.

As mentioned above, in accordance with this embodiment, similarly to the first embodiment, with the sensor information distribution, the deficient data can be decreased in the region in which the high precision and resolution is required. For this, also in a case where the deficient data has existed, it is possible to enhance the possibility that the estimating means 223 succeeds in forecasting/estimating/complementing the deficient data, thereby to restore the sensor information distribution.

Further, in this embodiment, the estimating means 223 forecasts/estimates/complements the deficient data, thereby to restore the sensor information distribution. This enables the sensor network system of this embodiment to provide the sensor information distribution without the deficit (low precision/low resolution) due to non-arrival of the sensor information. That is, it is possible to provide the sensor information distribution expressed at the maximum precision (resolution) of the sensor network system.

Further, in this embodiment, the model deciding means 225 updates the event model, which is employed for calculating the contribution degree and restoring the sensor information distribution, and modifies the event model into the model corresponding to the event that actually has occurred.

Accordingly, it becomes possible to follow in the wake of the even that actually has occurred, thereby to change the event model, to calculate the contribution degree of which the precision is higher (more effective) and to provide the sensor information distribution.

Further, the decision of the event model and the update of the event model are repeated, whereby setting the initial event model in the beginning enables the event model to approach the true event model even in a case where the event model is unknown. For this, also in a case where the event model is unknown, it is possible to avoid occurrence of the response implosion problem, and enhance the precision (resolution) of the sensor information distribution.

EXAMPLE 1

Next, an operation for carrying out the present invention will be explained by employing the specific example. Additionally, the first example corresponds to the first embodiment of the present invention.

Figure 12:
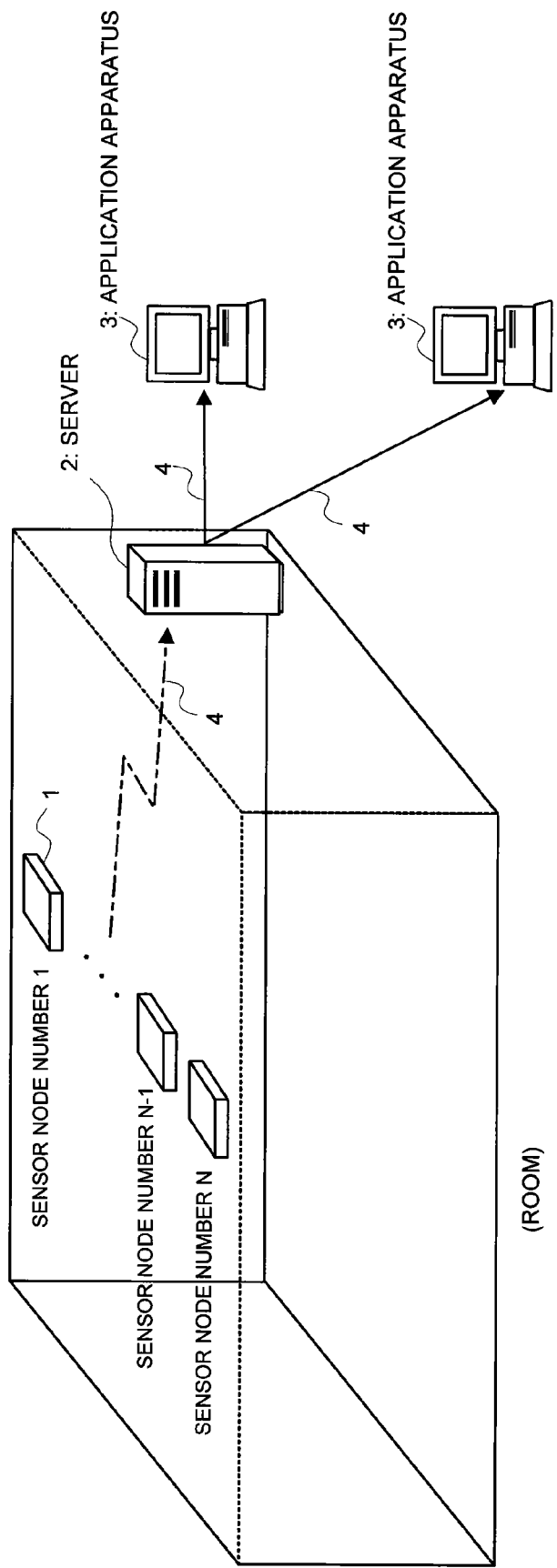
FIG. 12 is an explanatory view illustrating one configuration example of a first example.

FIG. 12 is an explanatory view illustrating one configuration example of the first example. In the first example of the present invention, the sensor network system is configured of a sensor node 1 having a temperature sensor, a server 2, and an application apparatus 3. Further, it is assumed that each apparatus has the identical configuration to the configuration shown in the block diagram of FIG. 2.

The communication node 11 of all sensor nodes 1, the server 2 and the application apparatus 3 are realized by means of the personal computers (hereinafter, referred to as a PC) each having software installed.

Additionally, the communication node 11 of the sensor node 1 receives the sensor information transmitted by the other spatially neighboring sensor node.

In the first example, N sensor nodes 1 are linearly installed in the ceiling of the room, being an object of observation, in order to measure a temperature distribution of the room, being an object of observation. That is, it is assumed that each sensor node 1 is one-dimensionally and equidistantly installed, and a sensor node number i (i=1–N) specific hereto is affixed, respectively. Additionally, such a sensor arrangement and sensor node number is provided for explanation, and the other scheme, which allows each sensor node to be identified separately, and yet a relation with the other sensor node to be easily obtained, may be employed.

The server 2 receives the sensor information from the sensor node 1, and transmits the sensor information distribution to the application apparatus 3 in a format suitable for the latter. The application apparatus 3 provides the user "a temperature distribution display service" for displaying the temperature distribution information of the room, being an object of observation, based upon the received sensor information distribution.

The sensor node 1, the server 2, and the application apparatus 3, which are connected via the communication network 4 in accordance with the IEEE802.11b standard, respectively, are communicable with each other by mutually employing an Internet protocol (IP), and an address necessary for communication is allocated to each apparatus. Additionally, employment of the wireless communication network or the IP for communication does not limit the applicable scope of the present invention, and the communication between the apparatuses may be realized by employing the other communication network or the technique other than the IP.

Additionally, in the following explanation, it is assumed that the sensor information indicates a temperature T [Kelvin (K)] (T≧0). This is set for explanation, and needless to say, the present invention is also applicable to the sensor of the other unit or a different type.

Further, it is assumed that the event model, which the sensor network system in the first example presumes, says that the probability that the value, which the sensor information indicates, is the middle value (average value) of the values that are indicated by the items of the sensor information transmitted by the neighboring other sensor nodes is high. Additionally, hereinafter, the value that the sensor information indicates is referred to as sensor data. The second communicating means 221 of the server 2 receives the sensor information indicating sensor data $s_i$ (0≦i≦N, $s_i$≧0) from each sensor node 1.

The data collecting means 222 preserves the sensor data $s_i$ in a memory (not shown in the figure) as an aggregation. Let this be defined as a sensor information distribution {$s_i$|0≦i≦N}. However, let deficient sensor data, which has not received yet, be defined as $s_i$=0.

The sensor 11 of the sensor node 1 measures the temperature, thereby to output the sensor information indicating the temperature T [Kelvin (K)] (T≧0) as the sensor data.

The sensor inputting means 124 acquires sensor data $s_i$=T at a period of a time τp cyclically. This τp is equivalent to one basic clock of this system, and hereinafter is referred to as a probe time. Herein, let τ p=0.1 sec.

The contribution degree calculating means 123 employs one item of sensor data $s_i$, and sensor data $s_{i-1}$ and $s_{i+1}$ (sensor data that is indicated by the sensor information transmitted by the other sensor node neighboring the sensor node 1) that neighbor the one item of sensor data $s_i$, thereby to calculate the contribution degree.

At first, sensor data $s'_i$, which is expected from the event model at the time that the neighboring sensor data $s_{i+1}$ and data $s_{i-1}$ have existed, has the middle value (average value) of $s_{i-1}$ and $s_{i+1}$: $s'_i=(s_{i-1}+s_{i+1})/2$ Let an absolute value ϵ of a difference between this value ($s'_i$: forecasted value) and the actually measured value be defined as ϵ=|$s_i$−$s'_i$| (ϵ≧0).

From the event model saying that the probability that the sensor data assumes the middle value (average value) of the neighboring sensor data is high, it is thinkable that the probability that the actually measured value is close to the forecasted value is high. That is, the probability that the event indicating the sensor data of which a difference ϵ between the forecasted value and the actually measured value is small occurs is high and to the contrary the probability that the event indicating the sensor data of which a difference ϵ is large occurs is low.

Let an occurrence probability p(ϵ) of the sensor data having such a difference ϵ be defined as p(ϵ)=1/(exp(β(ϵ−μ))+1) (0≦p≦1).

Herein, μ(μ≧0) is a parameter that characterizes an extent of a deviation from the forecasted value of the sensor data, and β(β≧0) is a parameter that characterizes a fluctuation of the deviation.

Herein, p(ϵ)=1/(exp(β(ϵ−μ))+1) is called a Fermi distribution function, and it is known that at a limit of β→∞, p(ϵ)=1 when ϵ<μ, and p(ϵ)=0 when ϵ>μ, which allows the occurrence probability p(ϵ) to assume a stepped shape, and that in a case where β is a finite value, the above-mentioned stepped shape becomes a shape collapsed on both sides of ϵ=μ with a width of approx. 1/β.

Additionally, μ and β are adjusted and decided on the basis of the specification of the sensor 11 and the event, being an object of observation; however herein on the assumption that a difference ϵ between the forecasted value and the actually measured value is mainly distributed in a region of 0<ϵ<1[K], let μ=1, and on the assumption that the edge of the region has a spread (fluctuation) of 0.3[K] or so, let β=3(≈1/0.3).

Next, Let a contribution degree I of the sensor data $s_i$ having a difference ϵ between the forecasted value and the actually measured value be defined as I(ϵ)=1n(1/p) (0≦I≦∞).

Figure 13:
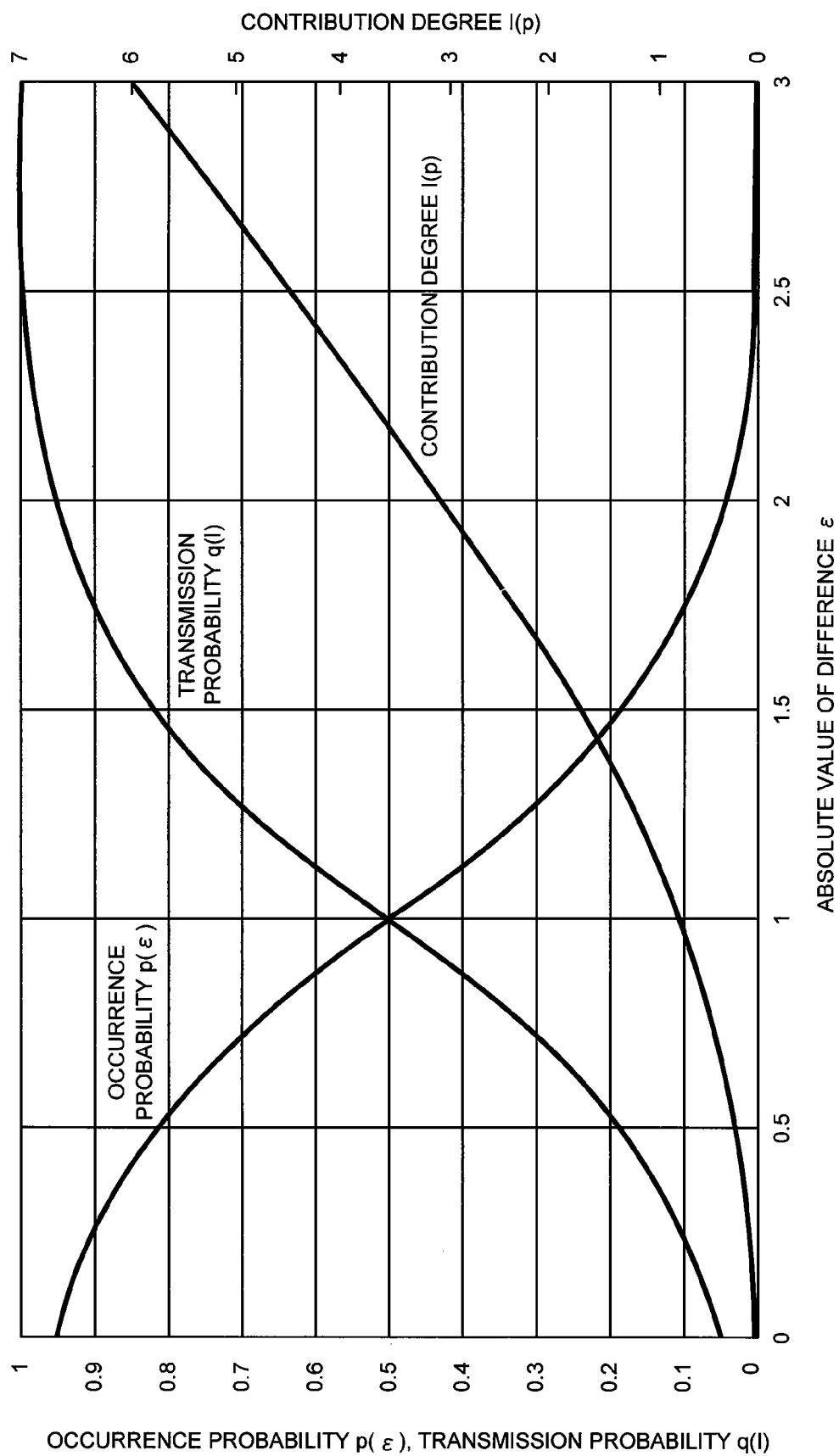
FIG. 13 is a graph illustrating a relation of an absolute value of a difference $\epsilon$, an occurrence probability p, a contribution degree I, and a transmission probability q when $\mu=1$ and $\beta=3$.

FIG. 13 is a graph illustrating a relation of a absolute value of the difference ϵ, the occurrence probability p, the contribution degree I, and the transmission probability q when μ=1 and β=3.

Defining the contribution degree in such a manner enables the sensor data to be easily forecasted/estimated. That is, the contribution degree becomes small for the sensor data of which the occurrence probability is high. On the other hand, the sensor data of which the occurrence probability is low is configured to have the value of which the contribution degree is large because the forecast/estimate is difficult.

The communication controlling means 122 adopts the stochastic transmission technique of drawing a conclusion on propriety of transmission with the probability q for each probe time τp as the communication control technique.

Further, with the communication control condition (algorithm) for deciding this transmission probability q, let q=1−exp (−I)=1−p.

Thus, the communication controlling means 122 generates a random number R (R is a real number, $0 \leq R < 1$) for each probe time $\tau p$, instructs the first communicating means 121 to transmit the sensor information if the random number R is smaller than q (R<q), and instructs the first communicating means 121 not to transmit the sensor information if the random number R is larger than q (R$\geq$q).

The first communicating means 121 transmits the sensor information indicating the sensor data $s_i$ to the server 2 via the communication network 4. Further, the first communicating means 121 intercepts the sensor information that flows in the communication network 4, and collects the sensor data $s_{i-1}$ and $s_{i+1}$ that neighbor the sensor number i.

Next, a specific operational example in the first example will be explained.

OPERATIONAL EXAMPLE 1

It is assumed that the sensor data detected by the sensor node neighboring a certain i-th sensor node 1 $s_{i-1}=s_{i+1}=25.00+273.16$[K], the occurrence probability of the sensor data p=0.95, and the contribution degree I=0.049. And, upon having acquired $s_i=25.10+273.16$[K] as the sensor data after waiting (sleeping) for the probe time $\tau p$, it follows that the forecasted value $s'_i=(s_{i-1}+s_{i+1})/2=25.00+273.16$[K], the difference between the forecasted value and the actually measured value $\epsilon=0.10$, the contribution degree I=0.065, and the transmission probability q=0.063. The average transmission period in this case $\tau p/q=15.9$ sec.

OPERATIONAL EXAMPLE 2

In succession to the operational example 1, think about the case that the temperature has risen in the region having a spread including the region in which an (i−1)-th, an i-th, and an (i+1)-th sensor node 1 exist, and yet the case that the (i−1)-th sensor node, and the (i+1)-th sensor node have not transmitted the sensor information.

Assume that the i-th sensor node has acquired si=26.70+ 273.16[K] as the sensor data, it follows that the forecasted value $s'i=(s_{i-1}+s_{i+1})/2=25.00+273.16$[K], the difference between the forecasted value and the actually measured value $\epsilon=1.70$, the contribution degree I=2.22, and the transmission probability q=0.89. The average transmission period in this case $\tau p/q=1.1$ sec.

OPERATIONAL EXAMPLE 3

In succession to the operational example 2, think about the case that the (i−1)-th sensor node and the (i+1)-th sensor node 1 have transmitted the sensor information.

Assume that the (i−1)-th sensor data and the (i+1)-th sensor data si−1=26.50+273.16[K] and si+1=26.60+273.16[K], respectively, and that the i-th sensor node has acquired $s_i=26.75+273.16$[K] as the sensor data, it follows that the forecasted value $s'_i=(s_{i-1}+s_{i+1})/2=26.55+273.16$[K], the difference between the forecasted value and the actually measured value $\epsilon=0.20$, the contribution degree I=0.13, and the transmission probability q=0.087. The average transmission period in this case $\tau p/q=12.0$ sec.

It can be seen from the foregoing operational example 1 and operational example 2 that the contribution degree is low and the transmission probability is also low (I=0.065 and q=0.063) at the time of the stationary state in which the temperature changes hardly; however when the temperature of a certain region rises, not only the contribution degree but also the transmission probability rise (I=2.22 and q=0.89).

Further, it can be seen from the operational example 3 that as the collection of the sensor data proceeds in the sever 2, not only the contribution degree but also the transmission probability becomes low (I=0.087 and q=0.083).

As mentioned above, this embodiment enables the spatial precision to be enhanced with the process responding to the contribution degree in a case of spatially necessitating the precision because the temperature rises in a certain region. And, the server 2 can provide the sensor information distribution of which the spatial precision is high.

Further, the transmission probability is decided according to the contribution degree, whereby stochastically dispersing blanket transmission of the sensor information while a priority is given to the transmission of the sensor information having a high contribution degree enables occurrence of the response implosion problem to be avoided.

Additionally, in this example was employed the event model saying that the probability that the sensor data assumed the middle value (average value) of the neighboring sensor data was high, however the applicable scope of the present invention is not limited to this event model. For example, it is possible to employ not only the linear relation such as the middle value but also the high-order, i.e. second-order or more, correlativeness. Further, the other technique, which is the technique enabling a certain sensor node to calculate the contribution degree of its own sensor data from the sensor data of the other sensor node, may be employed.

EXAMPLE 2

Next, a second example of the present invention will be explained. Additionally, the second example corresponds to the third embodiment of the present invention.

It is assumed that the arrangement (FIG. 12) of the sensor node, its purpose, etc. in the sensor network system of the second example is similar to that of the first example. Further, it is assumed that each apparatus has the configuration similar to the configuration shown in the block diagram of FIG. 5.

The operation other than that of the estimating means 223 of the server 2 is similar to that of the first example, so explanation is omitted.

The estimating means 223 adopts a linear interpolation as the method of estimating the sensor data that is deficient (hereinafter, simply referred to as deficient data). That is, the estimated value $s'_i$ of the deficient data $s_i$ is obtained with $s'_i=(s_{i-1}+s_{i+1})/2$ by employing the sensor data $s_{i-1}$ and $s_{i+1}$ that spatially neighbor the deficient data $s_i$. And, the deficient data of the sensor information distribution $\{s_i | 0 \leq i \leq N\}$ is replaced with the estimated value $s'_i$.

Figure 14:
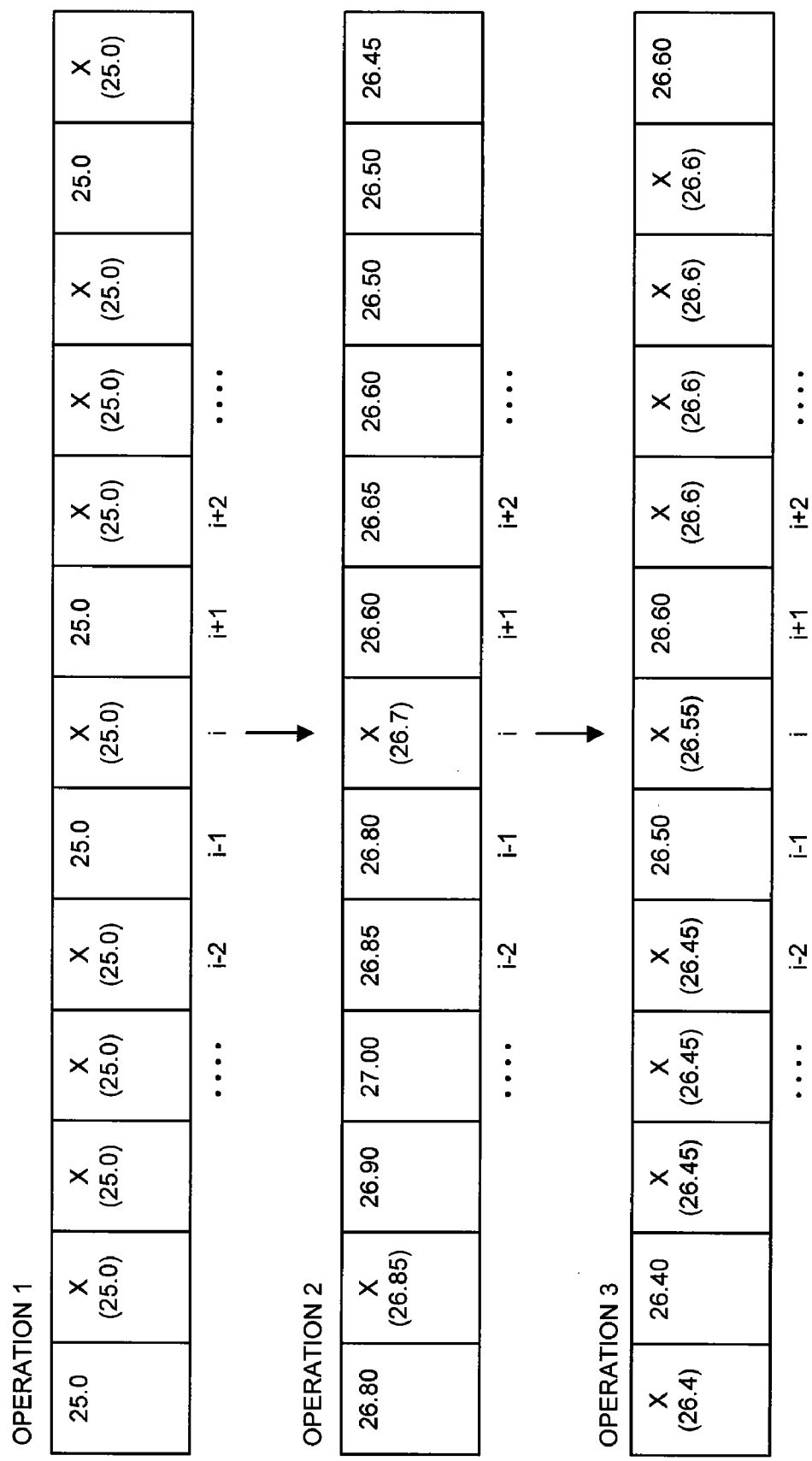
FIG. 14 is an explanatory view illustrating sensor information distribution examples in an operational example 1 to an operational example 3.

Next, a specific operational example in the second example will be explained by making a reference to the accompanied drawings. FIG. 14 is an explanatory view illustrating the sensor information distributions in the operational example 1 to the operational example 3.

In FIG. 14, X indicates the deficient data, and the figure in the parenthesis indicates a result of the estimation carried out by the estimating means 223, In the operational example 1, the deficient data is numerous, and there is no fluctuation in the value of the sensor data that is not deficient. In the operational example 2, the deficient data is little, and a fluctuation in the value of the sensor data that is not deficient is large. In the operational example 3, the deficient data is numerous, and a fluctuation in the value of the sensor data that is not deficient is small.

In the operational example 1 and the operational example 3, the transmission probability is low, and the deficient sensor data becomes numerous; however the precision (resolution)

is not necessitated so much and the estimation of the deficient data is easy because this state is a stationary state where the contribution degree is low and the temperature changes hardly.

The operational example 2 is in a state where the temperature rises in a certain region, a fluctuation in the temperature distribution becomes large, and the precision (resolution) is necessitated. In such a state, the contribution degree become high, and the transmission probability becomes high, thereby allowing the spatial density of the sensor data to be raised. Accordingly, the deficient data is very little even though it exists, and the possibility that the estimation of the estimating means 223 allows the deficient data to be restored is high.

As mentioned above, this example makes it possible to fluctuate the spatial density of the sensor data responding to a fluctuation in the value that is indicated by the sensor information that is not deficient, and to estimate the deficient data.

Additionally, the contribution degree calculating means 123 may causes a memory (not shown in the figure) to store the sensor data that the input sensor information indicates. Further, the event model for calculating the contribution degree based upon the sensor data that is indicated by the sensor information input in the past and the sensor information input next to the sensor information for which the contribution degree should be calculated, respectively, may be set to the contribution degree calculating means 123. That is, the contribution degree calculating means 123 may calculate the contribution degree based upon the sensor information that temporally neighbors the sensor information for which the contribution degree should be calculated.

And, the data collecting means 222 may generate the sensor information distribution based upon the sensor information transmitted by one sensor node. Further, the estimating means 223 may estimate the deficient data based upon the temporally neighboring sensor information.

Making a configuration in such a manner allows the contribution degree calculating means 123 to calculate the contribution degree of the sensor information based upon the temporally neighboring sensor information. Further, the data collecting means 222 generates the sensor information distribution, being the temporal distribution of the sensor information, based upon the sensor information transmitted by one sensor node. This enables the server 2 to provide the application apparatus 3 the sensor information distribution, being the temporal distribution of the sensor information. That is, the server 2 can provide the application apparatus 3 the sensor information distribution of which the temporal precision is high.

EXAMPLE 3

Next, a third example of the present invention will be explained. Additionally, the third example corresponds to the fifth embodiment of the present invention.

Figure 15:
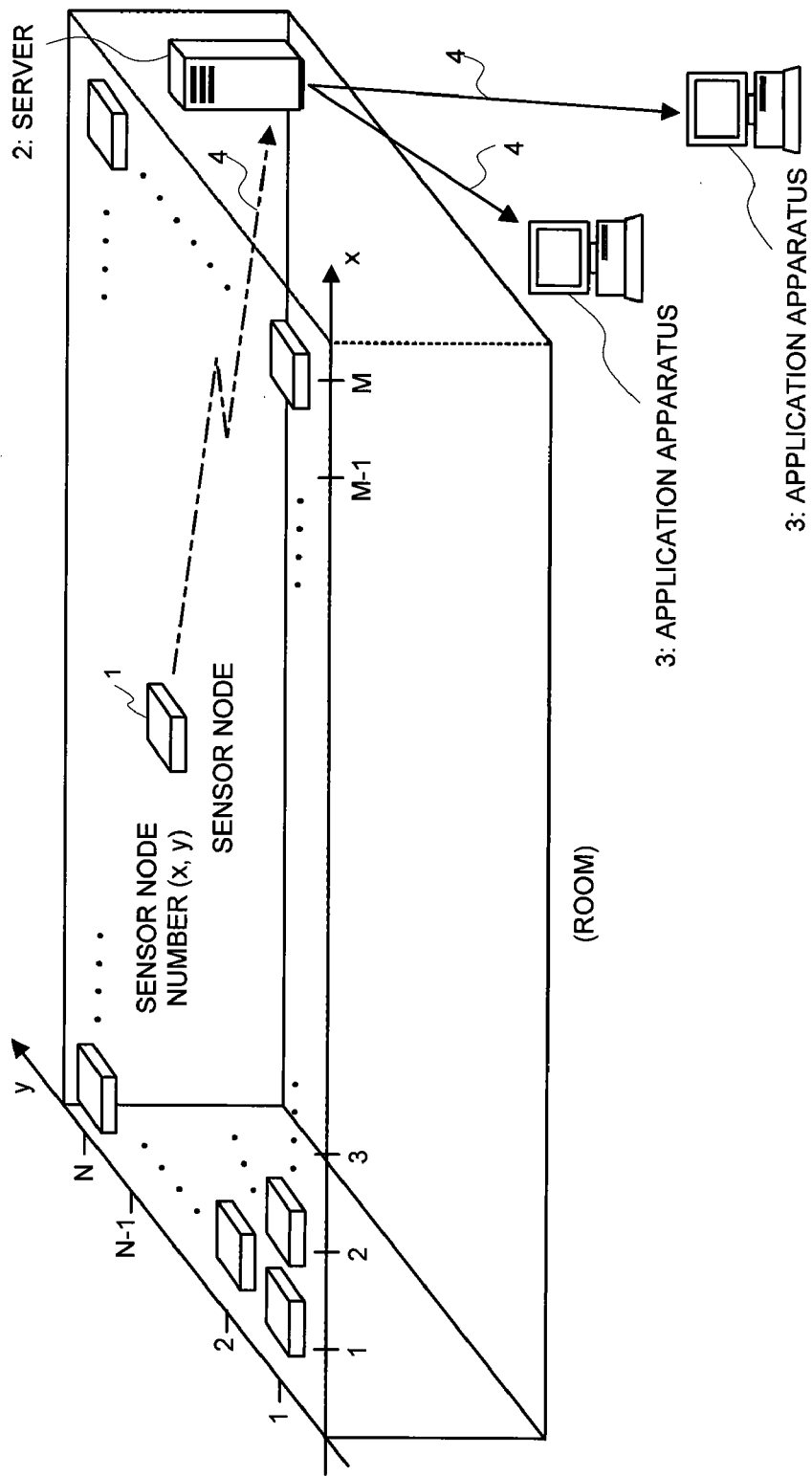
FIG. 15 is an explanatory view illustrating one configuration example of a third example.

FIG. 15 is an explanatory view illustrating one configuration example of the third example. The sensor network system is configured of a sensor node 1 having a moving body sensor for detecting existence of a body in motion, a sever 2, and an application apparatus 3. Further, it is assumed that each apparatus has a configuration similar to the configuration shown in the block diagram of FIG. 8.

And, the communication node 11 of all sensor nodes 1, the server 2, and the application apparatus 3 are realized by means of the PC having the software installed, respectively.

In the third example, M×N sensor nodes 1 are installed in a two-dimensional square lattice shape (M×N pieces) onto the ceiling of the room, being an object of observation, in order to measure a distribution of the moving body within the room, being an object of observation. That is, it is assumed that each sensor node 1 is two-dimensionally and equidistantly installed, and each sensor node number (x, y) (herein, x=1~M, y=1~N) specific hereto is set.

Additionally, such a sensor arrangement and sensor node number is set for explanation, the other scheme, which allows the sensor node 1 to be identified separately and a relation with other sensor node to be easily obtained, may be employed.

The server 2 receives the sensor information from the sensor node 1, and transmits the sensor information distribution to the application apparatus 3 in a format suitable for the latter. The application apparatus 3 provides the user "a moving body distribution display service" displaying the moving body distribution information within the room, being an object of observation, based upon the received sensor information distribution.

The sensor node 1, the server 2 and the application apparatus 3 are connected with each other similarly to the first example.

Additionally, in the following explanation, it is assumed that the sensor data is a Boolean value $\sigma(\sigma=1$: at the time of detection, and $\sigma=-1$: at the time of non-detection). This is set for explanation, and needless to say, the present invention is also applicable to the sensor of the other unit or a different type.

It is assumed that the event model, which this system hypothesizes, follows the Markov random field saying that the probability that, with the value of the binary sensor data assumed to be a probability variable, its probability variable assumes the identical value to that of the sensor data detected by the neighboring sensor node is high.

The Markov random field, which is a probability model that is generally employed for the image restoration technology etc., is described in the non-patent document 2. Additionally, explanation of the Markov random field model and the Bayes estimation, etc. is omitted herein.

Assume that the true sensor data (probability variable), i.e. the probability variable of the event itself, is $(f_{x,y})$, a probability distribution P(f) of a probability field $f=\{f_{x,y}|x=1, 2, \ldots, M, y=1, 2, \ldots, N\}$ is obtained as follows.

$$P(f)=(\exp(-(\frac{1}{2})\ \alpha\ \Sigma_{x=1}^{M}\Sigma_{y=1}^{N}((f_{x,y}-f_{x+1,y})^2+ (f_{x,y}-f_{x,y+1})^2)))/(\Sigma_f\ \exp(-(\frac{1}{2})\ \alpha\ \Sigma_{x=1}^{M}\Sigma_{y=1}^{N} ((f_{x,y}-f_{x+1,y})^2+(f_{x,y}-f_{x,y+1})^2)))$$

Herein, $\Sigma f$ behaves as follows.

$$\Sigma_f = \Sigma_{f1,\,1=\pm 1}\Sigma_{f1,\,2=\pm 1}\cdots\Sigma_{fM,\,N=\pm 1}$$

Further, $\alpha(\alpha>0)$ is a parameter (hyperparameter) that characterizes the probability distribution.

The first communicating means 221 of the server 2 receives sensor data $(g_{x,y})$ $(g_{x,y}=\pm 1)$ from each sensor node 1.

The data collecting means 222 collects a sensor information distribution $g=\{g_{x,y}|x=1, 2, \ldots, M, y=1, 2, \ldots, N\}$ from the sensor data (gx, y). The deficient data accompanied by the operational malfunction etc. of the sensor node 1, or the expiration of the term of validity of the sensor data could be included in the sensor information distribution g. Degraded data, being data degraded in a communication path of the communication network 4 could be included herein.

The model deciding means 225 decides the event model based upon the sensor information distribution g including the deficient data. Additionally, the so-called decision of the event model is to obtain the probability distribution P(f) of the true sensor data, and to decide a hyperparameter $\alpha$ herein.

It is known that in a case of obtaining the hyperparameter α that characterizes the event model, and in a case of estimating the event model from the sensor information distribution including the deficient data (in this case, estimating the hyperparameter α), it is effective to employ an EM algorithm. Herein, the EM algorithm is employed, thereby to obtain the hyperparameter α from the sensor information distribution The fourth communicating means 227 transmits the hyperparameter α obtained by the model deciding means 225 to the sensor node 1.

The sensor 11 of the sensor node 1 detects the moving body, and outputs the Boolean value σ(σ=1: at the time of detection, and σ=-1: at the time of non-detection) as the sensor information to the sensor inputting means 124. The sensor inputting means 124 operates similarly to the case of the example 1.

The model updating means 126 applies the hyperparameter α, which the fifth communicating means 127 received from the server 2, to the event model set in the contribution degree calculating means 123.

The contribution degree calculating means 123 employs one item of sensor data ($f_{x,y}$), neighboring sensor data ($f_{x-1,y}$), ($f_{x+1,y}$), ($f_{x,y-1}$), and ($f_{x,y+1}$), thereby to calculate the contribution degree.

At first, the probability p ($f_{x,y}$) for the value (±1) of ($f_{x,y}$) that the contribution degree calculating means 123 calculates is obtained as follows from the Markov random field.

$$p(f_{x,y}) = P(f_{x,y} | \{f_{u,v} | u=1, 2, \ldots, M, v=1, 2, \ldots, N, \text{where, } (u, v) = (x, y) \text{ is excluded}\}) = \exp(\alpha (f_{x-1,y} + f_{x+1,y} + f_{x,y-1} + f_{x,y+1}) f_{x,y}) / \Sigma_{f_{x,y}=\pm 1} \exp(\alpha (f_{x-1,y} + f_{x+1,y} + f_{x,y-1} + f_{x,y-1}) f_{x,y})$$

Where, ($f_{x-1,y}$), ($f_{x+1,y}$), ($f_{x,y-1}$), and ($f_{x,y+1}$) are true sensor data, respectively; however the latest neighboring sensor data is applied herein. That is, it is assumed that the neighboring sensor data, which does not represent the true sensor data at the current time point, is handles as the true sensor data.

Let the contribution degree be defined as $I(f_{x,y}) = \ln(1/p)$ ($0 \leq I \leq \infty$) similarly to the first example. Further, it is assumed that the communication controlling means 122 and the first communication means 121 operate similarly to the case of the first example, and the communication control technique and the communication control condition are also similar ones.

EXAMPLE 4

Next, a fourth example of the present invention will be explained. Additionally, the fourth example corresponds to the sixth embodiment of the present invention.

It is assumed that the arrangement of the sensor node (FIG. 12), its purpose, etc. in the sensor network system of the fourth example are similar to that of the second example. Further, it is assumed that each apparatus has the configuration similar to the configuration shown in the block diagram of FIG. 10.

The operation other than that of the estimating means 223 and the model updating means 226 of the server 2 is similar to that of the third example, so explanation is omitted.

The model updating means 226 applies the hyperparameter α, which the model deciding means 225 obtained, to the event model that the estimating means 223 employs.

The estimating means 223 estimates the true sensor data f from the sensor information distribution g. As such an estimation method, the Bayes estimation according to the Bayes theorem shown below is generally employed.

$$p(f|g) = (P(g|f) \cdot P(f) / \Sigma_f P(g|f) \cdot P(f))$$

That is, the expected value of the true sensor data shown below is obtained from a posterior provability distribution P (f|g).

$$m_{x,y} = \Sigma f_{x,y} p(f|g)$$

Herein, upon assuming that a degradation process P(g|f) is of binary symmetric channel (BSC), the degradation process P(g|f) is obtained with the following equation.

$$P(g|f) = (\exp(-(\frac{1}{2}) \beta \Sigma_{x=1}^{M} \Sigma_{y=1}^{N} (f_{x,y} - g_{x,y})^2))/(1 + \exp(-2\beta))^{MN}$$

Herein, β is a parameter that characterizes the degradation process, and the model deciding means 225 estimates β in deciding the event model similarly to the hyperparameter α. Further, in the fourth example, a mean-field approximation is employed, thereby to decide an expected value ($m_{x,y}$) of the true sensor data. And, the sensor information distribution g is replaced with an estimation result ($m_{x,y}$), which is transmitted to the application apparatus 3 via the third communicating means 224.

Apparent from the explanation of each embodiment and each example above, the present invention makes it possible to suppress the congestion of the communication network 4, and to provide the user the information (sensor information distribution) of which the precision (temporal resolution and spatial resolution) is high because the sensor node preferentially transmits the sensor information of which the contribution degree is spatially and temporally high to the server apparatus etc.

The present invention is applicable to the sensor network system for observing the event to transmit the observed information.

What is claimed is:

1. A sensor network system, comprising:
   a plurality of sensor nodes each including a sensor for detecting an event that has occurred, and a communicating facility configured to transmit sensor information indicating the event detected by said sensor at a timing corresponding to an influence that the event detected by said sensor exerts upon a sensor information distribution indicating a temporal distribution and a spatial distribution of said event; and
   an application apparatus for employing said sensor information distribution, thereby to process said sensor information.

2. The sensor network system according to claim 1, wherein the communicating facility of the sensor node more preferentially transmits the sensor information of which an influence is larger, said influence being exerted by the event detected by the sensor upon the sensor information distribution.

3. The sensor network system according to claim 1, wherein the sensor node having an event model, said event model obtained by making a modeling of the event that the sensor detects, includes a contribution degree calculator for, based upon said event model, calculating a contribution degree, being a degree at which an influence is exerted upon the sensor information distribution, and
   wherein the communication facility transmits the sensor information at a timing corresponding to the contribution degree calculated by said contribution degree calculator.

4. The sensor network system according to claim 3, wherein the contribution degree calculator of the sensor node calculates the contribution degree based upon the event that the sensor has detected currently, the event that the sensor detected in the past, and the event model.

5. The sensor network system according to claim 3, wherein the contribution degree calculator of the sensor node calculates the contribution degree based upon the event that the sensor has detected currently, the event that the sensor of the other sensor node has detected, and the event model.

6. The sensor network system according to claim 3, wherein the sensor node includes a model updating means for changing the event model set in the contribution degree calculator.

7. The sensor network system according to claim 1, comprising a server for receiving the sensor information from the sensor node, wherein said server includes a data collecting means for generating a sensor information distribution based upon the received sensor information.

8. The sensor network system according to claim 7, wherein the server includes an estimating means for, based upon the sensor information received from the other sensor node, or the sensor information that temporally or spatially neighbors sensor information that is deficient, and the set event model, estimating said sensor information that is deficient, thereby to restore the sensor information distribution.

9. The sensor network system according to claim 6, comprising a server for receiving the sensor information from the sensor node, wherein said server includes:
a data collecting means for generating a sensor information distribution based upon the received sensor information; and
a model deciding means for deciding the event model that the model updating means of the sensor node updates, based upon said sensor information distribution, and
wherein said model updating means of said sensor node changes the event model set in the contribution degree calculating means into the event model decided by said model deciding means.

10. The sensor network system according to claim 9, wherein the server includes an estimating means for, based upon the sensor information received from the other sensor node, or the sensor information that temporally or spatially neighbors sensor information that is deficient, and the set event model, estimating said sensor information that is deficient, thereby to restore the sensor information distribution,
wherein the model deciding means decides an event model that is set in said estimating means, based upon said sensor information distribution, and
wherein said server farther includes a model setting means for setting the event model decided by said model deciding means in said estimating means.

11. The sensor network system according to claim 7, wherein the server includes a sensor information distribution transmitting means for transmitting the sensor information distribution to an application apparatus.

12. The sensor network system according to claim 1, wherein the application apparatus includes a data collecting means for receiving sensor information from the sensor node, thereby to generate a sensor information distribution based upon the received sensor information.

13. The sensor network system according to claim 12, wherein the application apparatus includes an estimating means for, based upon the sensor information received from the other sensor node, or the sensor information that temporally or spatially neighbors sensor information that is deficient, and the set event model, estimating said sensor information that is deficient, thereby to restore the sensor information distribution.

14. A sensor node, comprising:
a sensor for detecting an event; and
a communicating means for transmitting sensor information indicating the event detected by said sensor at a timing directly related to an influence that the event detected by said sensor exerts upon a sensor information distribution indicating a temporal distribution or a spatial distribution of the event.

15. The sensor node according to claim 14, including an event model, said event model obtained by modeling of the event that the sensor detects, and comprising a contribution degree calculator for, based upon said event model, calculating a contribution degree, being a degree at which an influence is exerted upon the sensor information contribution.

16. The sensor node according claim 15, wherein the contribution degree calculator calculates the contribution degree based upon the event that the sensor has detected currently, the event that the sensor detected in the past, and the event model.

17. The sensor node according claim 15, wherein the contribution degree calculator calculates the contribution degree based upon the event that the sensor has detected currently, the event that the sensor of the other sensor node has detected, and the event model.

18. The sensor node according claim 15, comprising a model updating means for changing the event model in the contribution degree calculator.

19. A sensor information collector that is connected to a plurality of sensor nodes each comprising a sensor for detecting an event that has occurred, and receives sensor information indicating the event detected by said sensor, comprising:
a receiving means for receiving the sensor information; and
a data collecting means for, based upon said received sensor information, generating a sensor information distribution indicating a temporal distribution or a spatial distribution of the event;
and further comprising:
an estimating means for estimating, based upon the sensor information received from the other sensor node, or the sensor information that temporally or spatially neighbors sensor information that is deficient, and an event model that has been set, said event model obtained by making a modeling of the event that the sensor detects, said sensor information that is deficient, thereby to restore the sensor information distribution.

20. The sensor information collector according to claim 19, comprising:
a model deciding means for, based upon the sensor information distribution, deciding an event model that is set in the estimating means, said event model obtained by modeling of the event that the sensor detects; and
a model setting means for setting the event model decided by said model deciding means in said estimating means.

21. An event observation method employing a sensor network system comprising a plurality of sensor nodes each including a sensor for detecting an event that has occurred, and an application apparatus for processing sensor information indicating the event detected by said sensor, the method comprising:
an event detection step in which said sensor detects the event;
a sensor information transmission step in which a communicating means of said sensor node transmits the sensor information at a timing corresponding to an influence that the event detected by said sensor in said event detection step exerts upon a sensor information distribution indicating a temporal distribution or a spatial distribution of said event; and a sensor information process step in which said application apparatus employs the sensor information distribution, thereby to process the sensor information.

22. The event observation method according to claim 21, wherein the communicating means of the sensor node more preferentially transmits the sensor information of which an influence is larger, said influence being exerted by the event detected by the sensor upon the sensor information distribution in the sensor information transmission step.

23. The event observation method according to claim 21, comprising a contribution degree calculation step in which a contribution degree calculating means of the sensor node having an event model set calculates a contribution degree, being a degree at which an influence is exerted upon the sensor information distribution, said event model obtained by making a modeling of the event that the sensor detects, based upon said event model.

24. The event observation method according to claim 23, wherein the contribution degree calculating means of the sensor node calculates the contribution degree, based upon the event that the sensor has detected currently, the event that the sensor detected in the past, and the event model in the contribution degree calculation step.

25. The event observation method according to claim 23, wherein the contribution degree calculating means of the sensor node calculates the contribution degree based upon the event that the sensor has detected currently, the event that the sensor of the other sensor node has detected, and the event model in the contribution degree calculation step.

26. The event observation method according to claim 23, comprising a model update step in which a model update means of the sensor node changes the event model set in the contribution degree calculating means for setting.

27. The event observation method according to claim 21, comprising a data collection step in which a data collecting means of a server of the sensor network system generates the sensor information distribution based upon the received sensor information.

28. The event observation method according to claim 27, comprising an estimation step in which, based upon the sensor information received from the other sensor node, or the sensor information that temporally or spatially neighbors sensor information that is deficient, and the set event model, an estimating means of the server estimates said sensor information that is deficient, thereby to restore the sensor information distribution.

29. The event observation method according to claim 26, comprising:

a data collection step in which the data collecting means of the server of the sensor network system generates a sensor information distribution based upon the received sensor information; and a model decision step in which a model deciding means decides the event model that the model updating means of the sensor node updates, based upon said sensor information distribution, wherein said model updating means of said sensor node changes the event model set in the contribution degree calculating means into the event model decided in said model decision step by said model deciding means of said sensor node in a model update step.

30. The event observation method according to claim 29, comprising an estimation step in which, based upon the sensor information received from the other sensor node, or the sensor information that temporally or spatially neighbors sensor information that is deficient, and the set event model, an estimating means of the server estimates said sensor information that is deficient, thereby to restore the sensor information distribution, wherein the model deciding means decides the event model that is set in said estimating means, based upon the sensor information distribution in a model decision step, and further comprising a model setting step in which a model setting means of said server sets the event model decided by said model deciding means in said estimating means.

31. The event observation method according to claim 27, comprising a sensor information distribution transmission step in which a sensor information distribution transmitting means of the server transmits the sensor information distribution to the application apparatus.

32. The event observation method according to claim 21, comprising a data collection step in which a data collecting means of the application apparatus receives the sensor information from the sensor node to generate the sensor information distribution based upon the received sensor information.

33. The event observation method according to claim 32, comprising an estimation step in which, based upon the sensor information received from the other sensor node, or the sensor information that temporally or spatially neighbors sensor information that is deficient, and the set event model, an estimating means of the application apparatus estimates said sensor information that is deficient, thereby to restore the sensor information distribution.

34. A record medium having a program stored therein, said record medium being a computer-readable record medium, wherein said program is a sensor node program incorporated in and operable to cause a computer to perform a process of, in transmitting sensor information indicating an event detected by a sensor, more preferentially transmitting the sensor information that exerts a larger influence upon a sensor information distribution indicating a temporal distribution or a spatial distribution of the event.

35. A record medium having a program stored therein, said record medium being a computer-readable record medium, wherein said program is a sensor information collection program that is installed in a computer that is connected to a plurality of sensor nodes each comprising a sensor for detecting an event that has occurred, and receives sensor information indicating the event detected by said sensor, said sensor information collection program causing said computer to perform a data collection process of, based upon the received sensor information, generating a sensor information distribution indicating a temporal distribution or a spatial distribution of the event.

* * * * *

UNITED STATES PATENT AND TRADEMARK OFFICE
CERTIFICATE OF CORRECTION

PATENT NO. : 7,652,565 B2 Page 1 of 1
APPLICATION NO. : 11/532174
DATED : January 26, 2010
INVENTOR(S) : Takaoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 614 days.

Signed and Sealed this

Twenty-third Day of November, 2010

David J. Kappos
*Director of the United States Patent and Trademark Office*